(12) United States Patent
Ha et al.

(10) Patent No.: US 11,799,996 B2
(45) Date of Patent: Oct. 24, 2023

(54) ELECTRONIC DEVICE INCLUDING CAMERA POP-UP STRUCTURE

(71) Applicant: Samsung Electronics Co., Ltd., Gyeonggi-do (KR)

(72) Inventors: Dohyung Ha, Gyeonggi-do (KR); Wonseok Oh, Gyeonggi-do (KR); Saewon Kwon, Gyeonggi-do (KR); Kisung Kim, Gyeonggi-do (KR); Sangkyu Park, Gyeonggi-do (KR); Jungwon Lee, Gyeonggi-do (KR); Junghyuck Im, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/514,031

(22) Filed: Oct. 29, 2021

(65) Prior Publication Data

US 2022/0053075 A1 Feb. 17, 2022

Related U.S. Application Data

(63) Continuation of application No. PCT/KR2020/006490, filed on May 18, 2020.

(30) Foreign Application Priority Data

May 22, 2019 (KR) ........................ 10-2019-0059885

(51) Int. Cl.
*H04B 1/38* (2015.01)
*H04M 1/02* (2006.01)
(52) U.S. Cl.
CPC ....... *H04M 1/0264* (2013.01); *H04M 1/0237* (2013.01)

(58) Field of Classification Search
CPC ............. H01M 1/0225; H04M 1/0235; H04M 1/0237; H04M 1/0239; H04M 1/0254; H04M 1/0264
See application file for complete search history.

(56) References Cited

U.S. PATENT DOCUMENTS 10,284,697 B2 * 5/2019 Yin .......................... H04M 1/02
10,841,475 B2 * 11/2020 Zhang ................. H04M 1/0264
(Continued)

FOREIGN PATENT DOCUMENTS

CN 108833621 A 11/2018
KR 10-2005-0022912 A 3/2005
(Continued)

OTHER PUBLICATIONS

Korean Examination Report dated August 14, 2023.

*Primary Examiner* — Tuan Pham
(74) *Attorney, Agent, or Firm* — Cha & Reiter, LLC

(57) ABSTRACT

An electronic device according to certain embodiments, comprises: a housing; and a camera pop-up structure which is coupled to the housing, at least a part of which slides with respect to the housing between a first position accommodated inside the housing and a second position protruding from the housing, wherein the camera pop-up structure comprises: a guide member fixedly coupled to the inside of the housing; a slide member configured to slide with respect to the guide member by a first section and a second section extending from the first section in one direction or a reverse direction; and a camera module linked with the slide member moving within the first section so as to slide between the first position accommodated inside the housing and the second position protruding from the housing, and linked with the slide member sliding within the second section causing rotation towards a rear side or a front side of the housing.

14 Claims, 15 Drawing Sheets

(56) References Cited

U.S. PATENT DOCUMENTS

| | | | |
|---|---|---|---|
| 10,976,774 B2* | 4/2021 | Sun | ................ H05K 1/028 |
| 2005/0014357 A1 | 1/2005 | Bao et al. | |
| 2005/0014527 A1 | 1/2005 | Chambers et al. | |
| 2005/0049019 A1 | 3/2005 | Lee | |
| 2011/0045877 A1 | 2/2011 | Ahn et al. | |
| 2018/0307269 A1 | 10/2018 | Pantel | |
| 2018/0307270 A1 | 10/2018 | Pantel | |
| 2019/0253542 A1* | 8/2019 | Fan | ............... H04M 1/0237 |
| 2020/0154005 A1 | 5/2020 | Han et al. | |

FOREIGN PATENT DOCUMENTS

| | | |
|---|---|---|
| KR | 10-2010-0043482 A | 4/2010 |
| KR | 10-2010-0050671 A | 5/2010 |
| KR | 10-2011-0019211 A | 2/2011 |
| KR | 10-2012-0002512 A | 1/2012 |
| KR | 10-1395586 A | 5/2014 |
| KR | 10-1635205 B1 | 6/2016 |

* cited by examiner

ELECTRONIC DEVICE INCLUDING CAMERA POP-UP STRUCTURE

CROSS-REFERENCE TO RELATED APPLICATION(S)

This application is continuation of International Application No. PCT/KR2020/006490, filed on May 18, 2020, which claims priority to Korean Patent Application No. 10-2019-0059885 filed on May 22, 2019 in the Korean Intellectual Property Office, the disclosures of which are herein incorporated by reference.

BACKGROUND

1. Field

Certain embodiments of the disclosure relate to an electronic device including a camera pop-up structure.

2. Description of the Related Art

The consumer desire for a large display, portability, and front-facing camera (also known as a "selfie camera") imposes countervailing requirements on an electronic device. Specifically, to provide a larger display, the electronic device can have a larger front surface, or the display fully covers the front surface of the electronic device. The larger front surface reduces portability of the electronic device because at least one dimension is increased. The increased dimension can make it difficult to carry the electronic device in a pocket. Fully covering the front surface can leave no room for the front facing camera. Alternatively, placement of the front camera on the front surface of the electronic device can reduce the area of the display.

In line with development of technologies regarding electronics, information, and communication, various functions tend to be integrated into a single electronic device. For example, a smartphone includes not only a communication function, but also a music/video playback function, a messaging function, an imaging function, a camera function, and an electronic wallet function, among other functions. By installing additional applications, smartphones can implement more diversified functions. In addition to executing an embedded application or a stored file, an electronic device may access a server or another electronic device in a wired or wireless manner and receive various pieces of information in real time.

Widespread carriage or use of electronic devices (for example, smartphones) has been followed by diversified user demands regarding the exterior of the electronic devices. For example, in view of portability and use convenience, there may be increasing demands for electronic devices which are compact and can also provide larger screens. Such user demands regarding portability and use convenience may be satisfied by mounting a display having a screen display area approximately corresponding to 100% of the front area of the housing (for example, by implementing a full screen).

SUMMARY

The placement of a front facing camera on the front surface of the electronic device can reduce the available area for the display. In general, the necessity of the full screen structure has been highlighted in connection with electronic devices, but there may be difficulty in securing a sufficient screen display area on the front surface of the housing. For example, a camera module for video communication, selfie image capture, iris recognition, or facial recognition may be disposed on the front surface of an electronic device, and the space in which the camera module is disposed or the path of light to the camera module may make it difficult to secure a screen display area.

Certain embodiments disclosed in this document may provide electronic device including a camera module which can be accommodated in the electronic device to implement a full screen of the electronic device, and which can perform a stable rotating operation. In addition, an electronic device according to the disclosure may enable the user to selectively implement whether or not the camera module is popped up and whether or not the same is rotated.

Technical problems to be solved by the disclosure are not limited to the above-mentioned technical problems, and may be variously expanded without deviating from the idea and scope of the disclosure.

An electronic device according to certain embodiments comprises: a housing comprising a front plate facing a first direction and a rear plate facing a second direction opposite the first direction; a display configured to output content visible through the front plate; a guide member disposed inside the housing; a slide member configured to slide with respect to the guide member in a third direction or a fourth direction opposite the third direction, a section for the sliding movement of the slide member including a first section and a second section extending from the first section; a pop-up unit linked with the slide member moving within the first section, and configured to slide with respect to the housing in the third direction or the fourth direction between a first position accommodated inside the housing and a second position protruding from the housing; and a camera module linked with the slide member sliding within the second section, and configured to be rotatable to face the first direction or the second direction.

An electronic device according to certain embodiments, comprises: a housing; and a camera pop-up structure which is coupled to the housing, at least a part of which slides with respect to the housing between a first position accommodated inside the housing and a second position protruding from the housing, wherein the camera pop-up structure comprises: a guide member fixedly coupled to the inside of the housing; a slide member configured to slide with respect to the guide member by a first section and a second section extending from the first section in one direction or a reverse direction; and a camera module linked with the slide member moving within the first section so as to slide between the first position accommodated inside the housing and the second position protruding from the housing, and linked with the slide member sliding within the second section causing rotation towards a rear side or a front side of the housing.

An electronic device according to certain embodiments of the disclosure may include: a housing including a front plate oriented toward a first direction and a rear plate oriented toward a second direction opposite the first direction; a display configured to output a screen through the front plate; a guide member disposed inside the housing; a slide member configured to slide with respect to the guide member in a third direction or a fourth direction opposite the third direction, a section for the sliding movement of the slide member including a first section and a second section extending from the first section; a pop-up unit linked with the slide member moving within the first section, and configured to slide with respect to the housing in the third direction or the fourth direction between a position P1 accommodated inside the housing and a position P2 protruding from the housing; and a camera module linked with the slide member sliding within the second section, and configured to be rotatable to be oriented toward the first direction or the second direction.

An electronic device according to certain embodiments of the disclosure may include: a housing; and a camera pop-up structure which is coupled to the housing, at least a part of which slides with respect to the housing between a position P1 accommodated inside the housing and a position P2 protruding from the housing. The camera pop-up structure may include: a guide member fixedly coupled to the inside of the housing; a slide member configured to slide with respect to the guide member by a first section and a second section extending from the first section in one direction or a reverse direction; and a camera module linked with the slide member moving within the first section so as to slide between the position P1 accommodated inside the housing and the position P2 protruding from the housing, and linked with the slide member sliding within the second section so as to rotate to be oriented toward a rear side or a front side of the housing.

A camera pop-up structure according to certain embodiments of the disclosure may include: a guide member formed to be disposed inside a housing of an electronic device; a slide member configured to slide with respect to the guide member in a first direction or a second direction opposite the first direction, a section for the sliding movement including a first section and a second section extending from the first section; a pop-up unit linked with the slide member moving within the first section, and configured to slide with respect to the housing in the first direction or the second direction between a position P1 accommodated inside the housing and a position P2 protruding from the housing; and a camera module linked with the slide member sliding within the second section, and configured to be rotatable to be oriented toward a third direction or a fourth direction opposite the third direction.

According to the disclosure, an electronic device may include a camera pop-up structure which can be accommodated in the electronic device according to whether or not a camera device is used. Accordingly, a full screen of the electronic device is implemented, and the front/rear camera device is not exposed, thereby providing a pleasing and aesthetic appearance.

An electronic device including a camera pop-up structure according to the disclosure enables the user to selectively implement whether or not the camera module is popped up and whether or not the same is rotated, thereby improving convenience and efficiency.

DETAILED DESCRIPTION

Figure 1:
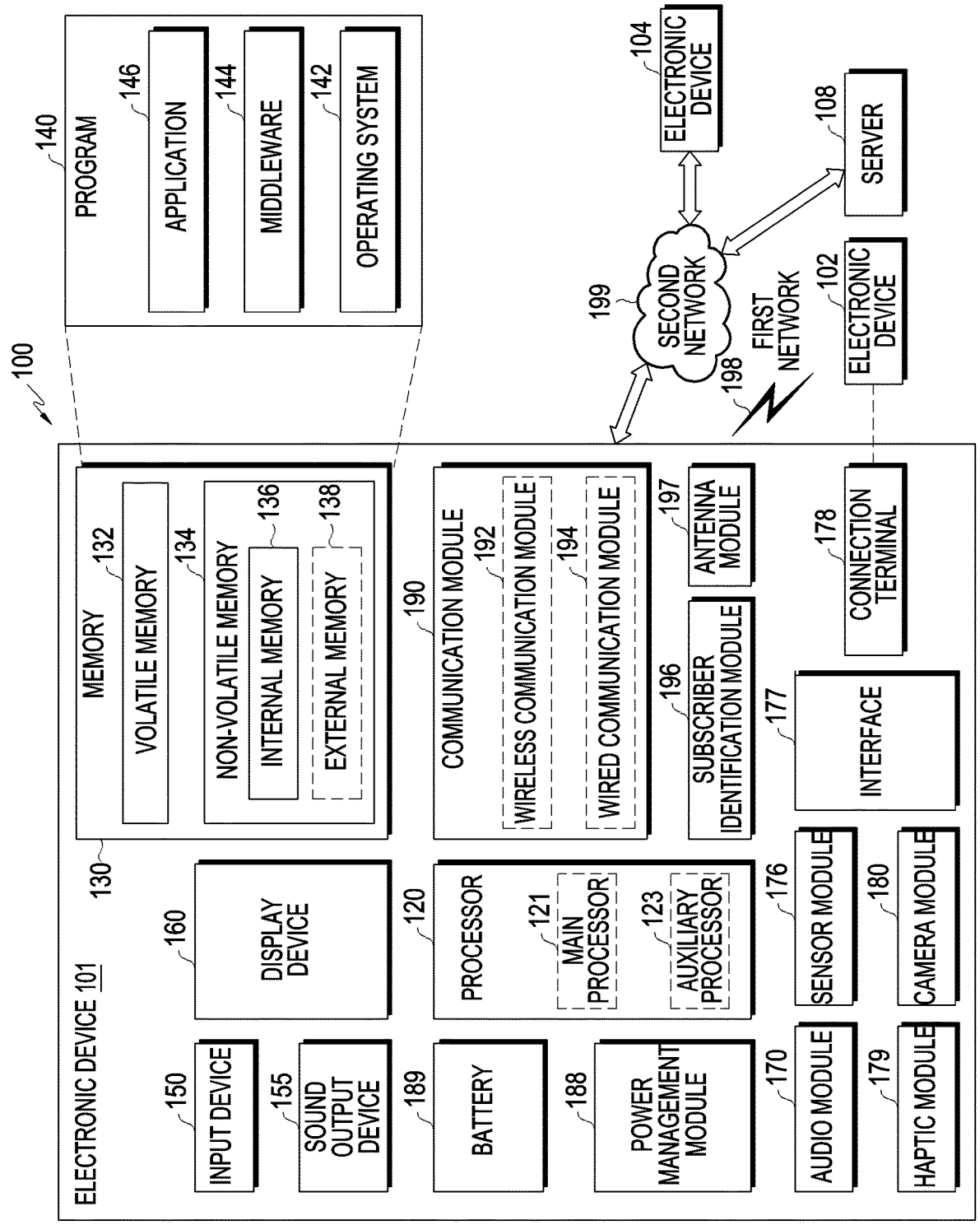
FIG. 1 is a block diagram of an electronic device in a network environment, according to certain embodiments of the disclosure.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

As noted above, a large display device 160 and a camera module 180 are desirable. The display device 160 can be increased in size by consuming an entire front surface (surface which faces the user in usage) of the electronic device 101. However, placement of the camera module 180 on the front surface can reduce the area available for the display device 160.

According to certain embodiments, the electronic device 101 includes a camera pop-up structure that either protrudes from or retracts into a side of the housing of the electronic device 101. The pop-up structure can include the camera module 180 that includes a first camera device, which can face the front direction, a second camera device which can face the rear direction, a sensor, and a light-emitting element, such as a flash.

In this manner, when the pop-up structure is retracted in the side of the housing of the electronic device 101, the display device 160 consumes the entire front surface of the electronic device 101. When the user wishes to use the camera module 180, the pop-up structure protrudes from the side of the housing of the electronic device 101. While this would not reduce the size of the display device 160, it may increase a dimension of the electronic device 101. However, the increase in a dimension may only occur when the user is actually using the camera module 180. When the user is not using the camera module 180, such as while moving with the device in their pocket, the pop-up structure can be retracted into the housing of the electronic device 101, thereby not increasing the dimension.

Figure 2A:
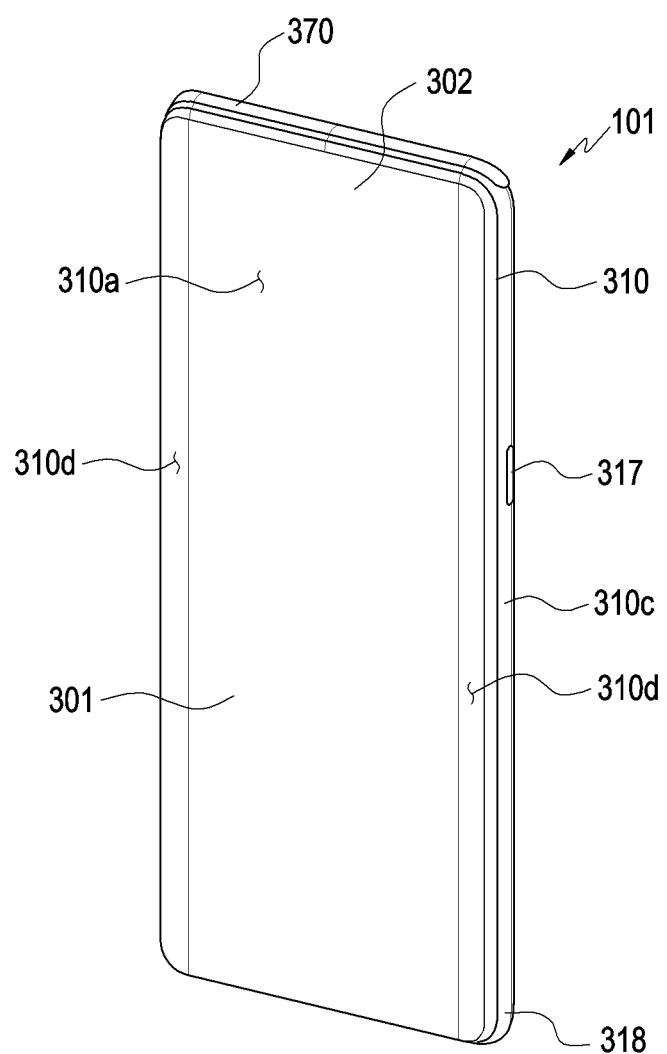
FIG. 2A is a front perspective view of an electronic device 101 according to certain embodiments of the disclosure.

Referring to FIG. 2A, an electronic device includes a housing 310 with a pop-up structure 370. The pop-up structure 370 is configured to protrude (see FIG. 3A, among others) and retract from the housing 310. The pop-up structure 370 can include cameras. Thus, when the user is taking pictures/video, the user can cause the pop-up structure 370 to protrude, thereby allowing the lens of the camera to be exposed to the outside of the housing 310. When the user is not taking pictures/video, the user can cause the pop-up structure to retract, thereby maintaining the dimension of the housing 310.

Figure 2B:
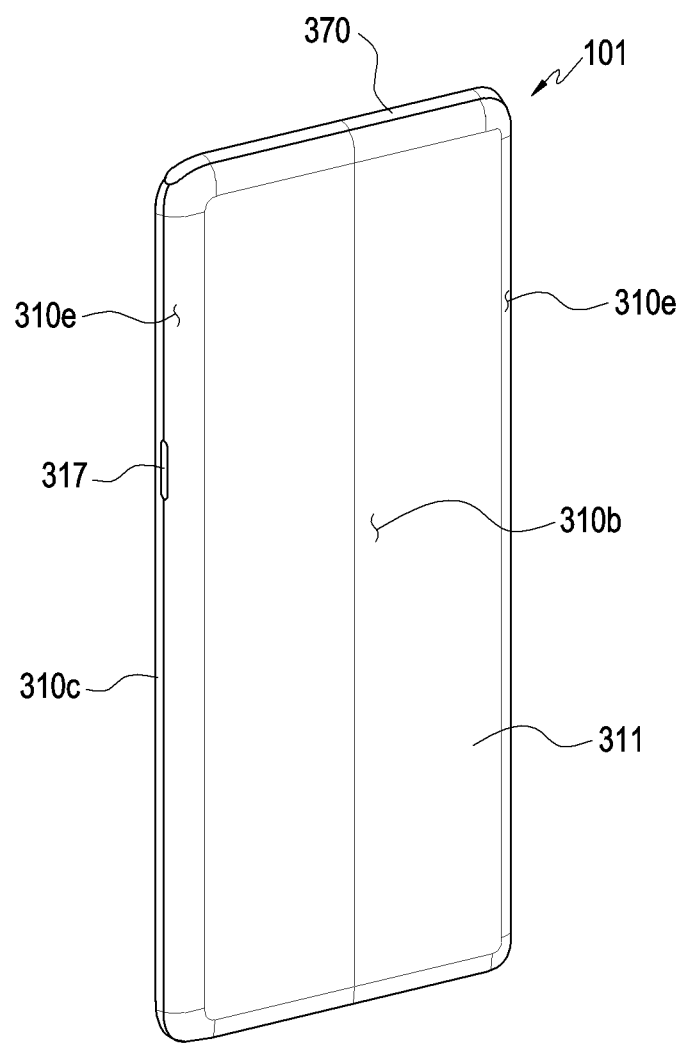
FIG. 2B is a rear perspective view of an electronic device 101 according to certain embodiments of the disclosure.

FIG. 2A is a front perspective view of an electronic device 101 according to certain embodiments of the disclosure. FIG. 2B is a rear perspective view of an electronic device 101 according to certain embodiments of the disclosure.

According to certain embodiments, FIGS. 2A and 2B illustrate a state where a camera pop-up structure 370 is accommodated inside an electronic device 101.

Referring to FIGS. 2A and 2B, an electronic device 101 according to an embodiment may include a housing 310 including a first surface (or front surface) 310*a*, a second surface (or rear surface) 310*b*, and a lateral surface 310*c* enclosing a space between the first surface 310*a* and the second surface 310*b*. In another embodiment (not shown), a housing may indicate a structure constituted by a few of the first surface 310*a*, the second surface 310*b*, and the later surface 310*c*, which are shown in FIG. 2A.

According to certain embodiments, the first surface 310*a* may be constituted by a front plate 302 (e.g., a glass plate or a polymer plate including various coated layers), at least a part of the front plate being substantially transparent. The second surface 310*b* may be constituted by a rear plate 311 which is substantially opaque. For example, the rear plate 311 may be constituted by coated or colored glass, ceramic, polymer, metal (e.g., aluminum, stainless steel (STS), or magnesium), or a combination of at least two of the above materials. The lateral surface 310*c* is coupled to the front plate 302 and the rear plate 311, and may be constituted by a lateral bezel structure 318 (or "lateral member") including metal and/or a polymer. In an embodiment, the rear plate 311 and the lateral bezel structure 318 may be integrally formed and include the same material (e.g., a metal material such as aluminum).

In the described embodiment, the front plate 302 may include two first regions 310*d* which seamlessly extend from the first surface 310*a* while being curved toward the rear plate 311 and are disposed on both ends of a long edge of the front plate 302. In the described embodiment (referring to FIG. 2B), the rear plate 311 may include two second regions 310*e* which seamlessly extend from the second surface 310*b* while being curved toward the front plate 302 and are disposed on both ends of a long edge thereof. In an embodiment, the front plate 302 (or the rear plate 311) may include only one of the first regions 310*d* (or the second regions 310*e*). In another embodiment, the front plate (or the rear plate) may not include some of the first regions 310*d* or the second regions 310*e*. According to the above embodiments, when viewed from the lateral surface of the electronic device 101, the lateral bezel structure 318 may have a first thickness (or width) in a lateral surface which does not include the first regions 310*d* or the second regions 310*e*, and may have a second thickness thinner than the first thickness in a lateral surface including the first regions 310*d* or the second regions 310*e*.

According to certain embodiments, the electronic device 101 may include at least one of a display 301, a key input device 317, and a camera pop-up structure 370. In another embodiment, the electronic device 101 may include at least one of an audio module, a sensor module, a light-emitting element, and a connector hole. In an embodiment, the electronic device 101 may omit at least one of the above components or additionally include other components.

According to certain embodiments, for example, the display 301 may be exposed through a substantial portion of the front plate 302. In an embodiment, at least a part of the display 301 may be exposed through the first surface 310a and the front plate 302 constituting the first regions 310d of the lateral surface 310c. In an embodiment, an edge of the display 301 may be formed to be mostly the same as the adjacent outer edge shape of the front plate 302. In another embodiment (not shown), in order to expand an exposed area of the display 301, an interval between the outer edge of the display 301 and the outer edge of the front plate 302 may be formed to be mostly the same as each other. For example, when viewed from above the front plate 302, an area of a screen display region of the display 301 may be equal to or higher than 90% of an area of the first surface 310a or be substantially 100% thereof. In another embodiment (not shown), a part of the screen display region of the display 301 includes a recess or an opening formed thereon, and another electronic component aligned with the recess or the opening, such as a camera module, a proximity sensor (not shown), or an illumination sensor (not shown), may be included.

In another embodiment (not shown), the rear surface of the screen display region of the display 301 may include at least one of an audio module, a sensor module, a camera module, a fingerprint sensor, and a light-emitting element. In another embodiment (not shown), the display 301 may be coupled to or disposed to be adjacent to a touch sensing circuit, a pressure sensor capable of measuring an intensity (pressure) of a touch, and/or a digitizer for detecting a stylus pen utilizing a magnetic field method.

According to certain embodiments, the key input device 317 may be disposed on the lateral surface 310c of the housing 310. In an embodiment, at least a part of the key input device 317 may be disposed in the first regions 310d and/or the second regions 310e. In another embodiment, the electronic device 101 may not include a part or the whole of the key input device 317, and the key input device 317 which is not included therein may be implemented on the display 301 in a different form such as a soft key. In an embodiment, the key input device may include a sensor module disposed on the second surface 310b of the housing 310.

According to certain embodiments, the camera pop-up structure 370 may be mounted inside the electronic device 101. In another embodiment, depending on a user's choice, the camera pop-up structure 370 may protrude to the outside of the electronic device 101 (referring to FIGS. 3A and 3B). As the camera pop-up structure 370 is mounted inside the electronic device 101, the display 301 may implement a full-screen structure capable of covering the entire region of the front plate 302. Accordingly, the electronic device 101 can provide a sense of elegance due to a sleek outward appearance in which neither a front camera nor a rear camera is exposed to the outside.

Figure 3A:
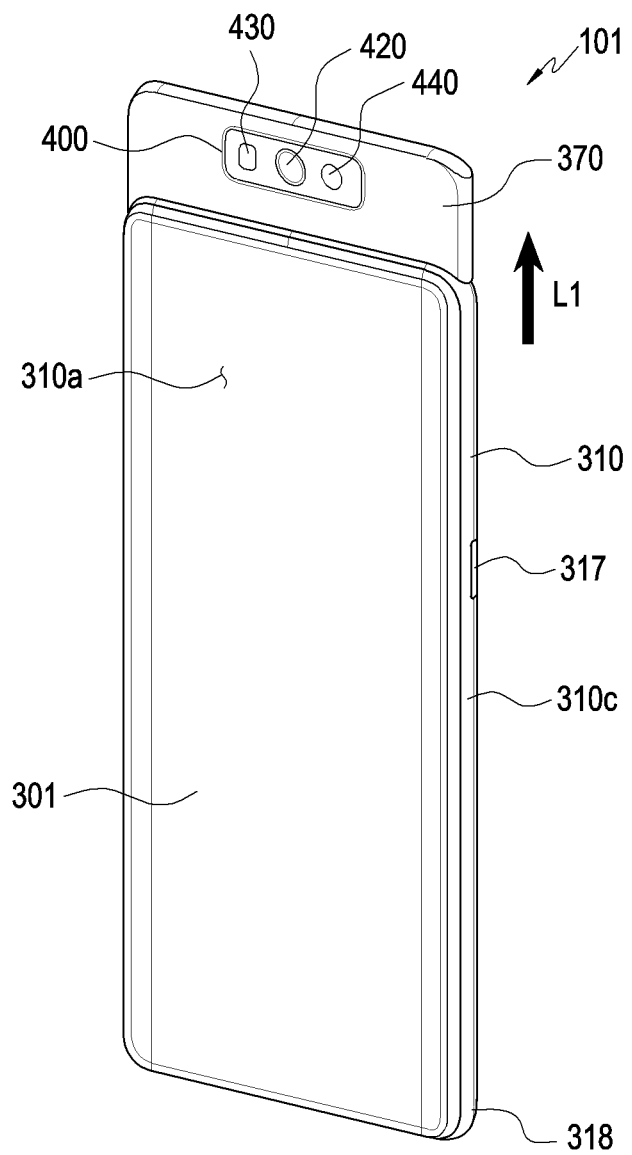
FIG. 3A is a front perspective view of an electronic device with a camera module thereof exposed, according to certain embodiments of the disclosure.
Figure 3B:
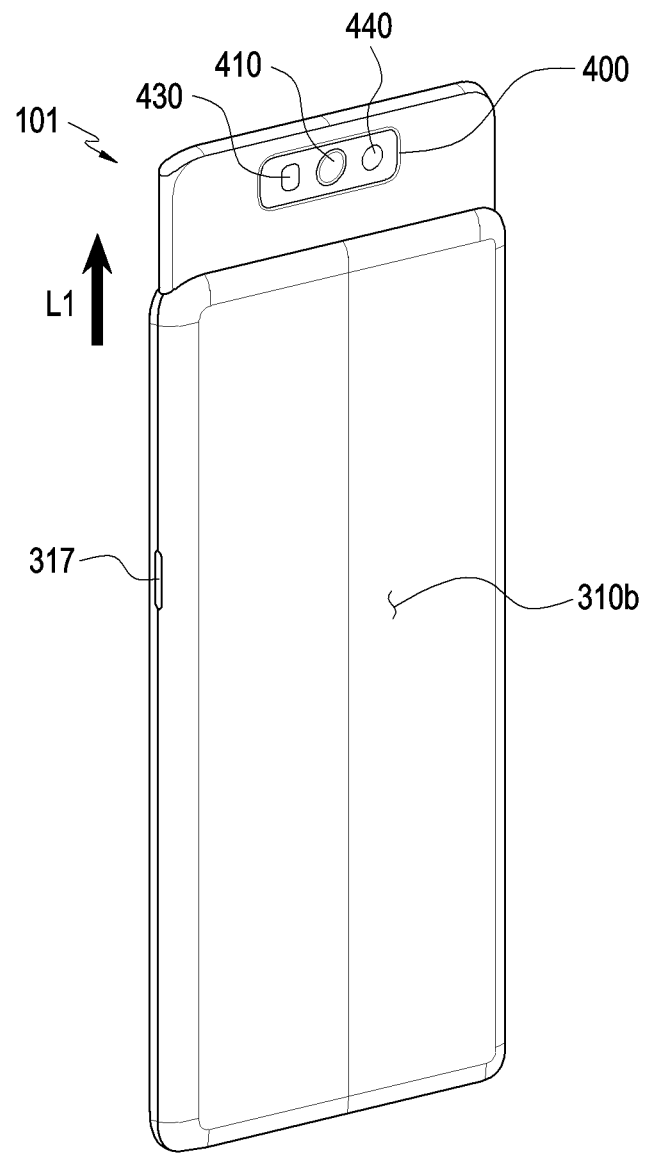
FIG. 3B is a rear perspective view of an electronic device with a camera module thereof exposed, according to certain embodiments of the disclosure.
Figure 4:
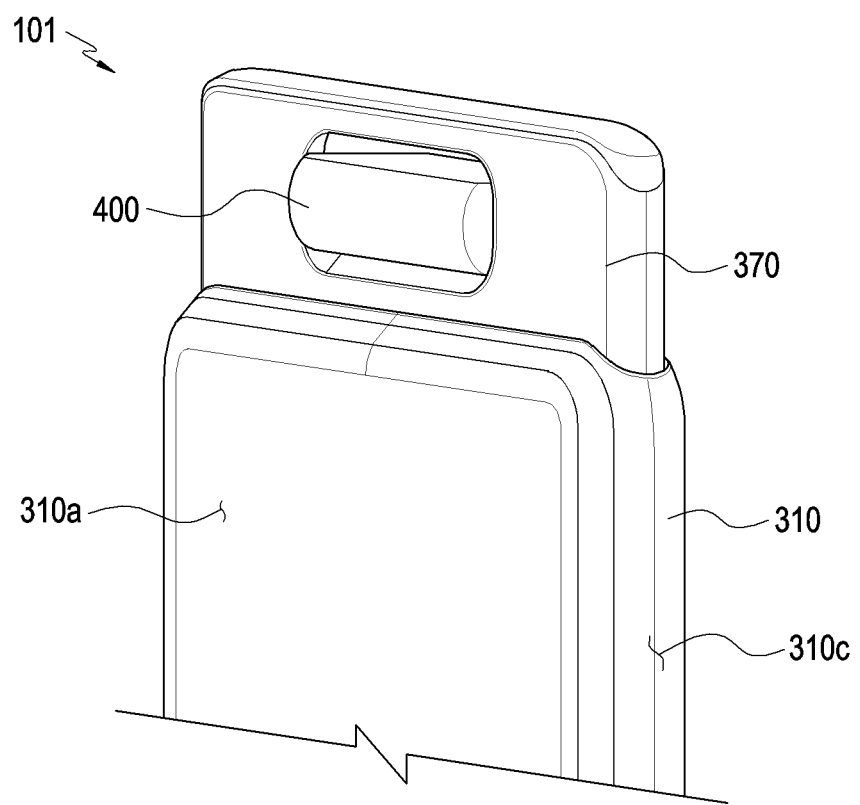
FIG. 4 illustrates a state where a camera module is rotatable, according to certain embodiments of the disclosure.

FIG. 3A is a front perspective view of an electronic device with a camera module thereof exposed, according to certain embodiments of the disclosure. FIG. 3B is a rear perspective view of an electronic device with a camera module thereof exposed, according to certain embodiments of the disclosure. FIG. 4 illustrates a state where a camera module is rotatable, according to certain embodiments of the disclosure.

According to certain embodiments, unlike FIGS. 2A and 2B, FIGS. 3A and 3B illustrate a state where a camera pop-up structure 370 is exposed (e.g., protrudes) to the outside of an electronic device 101.

Referring to FIGS. 3A and 3B, an electronic device 101 according to an embodiment may include: a housing 310 including a first surface (or front surface) 310a, a second surface (or rear surface) 310b, and a lateral surface 310c; a display 301; a key input device 317, and a camera pop-up structure 370. The housing 310, the display 301, the key input device 317, and the camera pop-up structure 370, which are shown in FIGS. 3A and 3B, are partially or entirely the same as the housing 310, the display 301, the key input device 317, and the camera pup-up structure 370 which are shown in FIGS. 2A and 2B.

The camera pop-up structure 370 may protrude to the outside of the electronic device 101, depending on a user's choice. For example, when a user executes a camera photographing mode of the electronic device 101, the camera pop-up structure 370 may be maintained in a standby state for a camera photographing operation while being automatically exposed (e.g., popping up) to the outside.

The camera pop-up structure 370 may be exposed toward an upper end direction (e.g., a third direction L1) of the housing 310, and include at least one camera module 400, although the pop-up structure 370 may be exposed towards the lower end, or a left or right side in other embodiments. The "upper end" shall refer to the upper side of the orientation of the electronic device 101 when the user is engaged in a phone call. The camera module 400 may include a first camera device 410, a second camera device 420, a sensor module 430, and/or a light-emitting element 440. For example, the second camera device 420 may be disposed to be oriented toward a first direction (e.g., a rear surface), and the first camera device 410 may be disposed to be oriented toward a second direction (e.g., a front surface) opposite the first direction. According to another embodiment, the second camera device 420 may be disposed to be oriented toward the second direction by rotating (e.g., rotating by 180 degrees), and the first camera device 410 may be disposed to be oriented toward the first direction by rotating (e.g., rotating by 180 degrees).

The first camera device 410 may photograph a subject in a direction opposite the direction in which the display 301 outputs a screen, and the second camera device 420 may photograph a subject in a direction substantially equal to the direction in which the display 301 outputs a screen, or may perform recognition of a user's iris or face. According to an embodiment, as the camera module 400 rotates, the first camera device 410 may photograph a subject in a direction substantially equal to the direction in which the display 301 outputs a screen, or may perform recognition of a user's iris or face.

According to certain embodiments, the first camera device 410 or the second camera device 420 may include one or a plurality of lenses, an image sensor, and/or an image signal processor. According to an embodiment, the camera module 400 may include a sensor module 430 (e.g., an infrared projector and an illumination sensor) or a light-emitting element 440 (e.g., a flash), which is linked with the camera devices 410 and 420. For example, an infrared projector or a flash is linked with the camera devices 410 and 420 so as to detect the depth of a subject or emit light toward a subject. In another embodiment, a flash may provide state information of the electronic device 101 in an optical form. For example, a flash may include an LED, an IR LED, and a xenon lamp.

In an embodiment, the sensor module 430 may generate an electric signal or a data value which corresponds to the internal operation state or the external environment state of the electronic device 101. For example, the sensor module 430 may be disposed in parallel to the camera devices 410 and 420, and further include at least one of a proximity sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illumination sensor.

According to certain embodiments, each of the first camera device 410 and the second camera device 420 may include a plurality of cameras, and the first camera device and the second camera device may be arranged in parallel to each other. In an embodiment, two or more lenses (an infrared camera, a wide-angle lens, and a telephoto lens) and image sensors may be arranged on one surface of the electronic device 101.

According to certain embodiments, when photographing for a selfie is performed by the rotation of the camera devices 410 and 420, a high-performance camera can be utilized. For example, when the first camera device 410 disposed to be oriented toward the rear surface has a higher performance than the second camera device 420, the first camera device 410 can photograph a selfie by the rotation of the camera module 400. The camera pop-up structure 370 according to the disclosure may be accommodated inside the housing 310 in a non-photographing mode in which a camera device is not used, and may be exposed to the outside only in a camera photographing mode. Accordingly, in a non-photographing mode, a camera is not exposed to the outside, whereby a sleek outward appearance and a sense of elegance due to the outward appearance can be provided.

Figure 5:
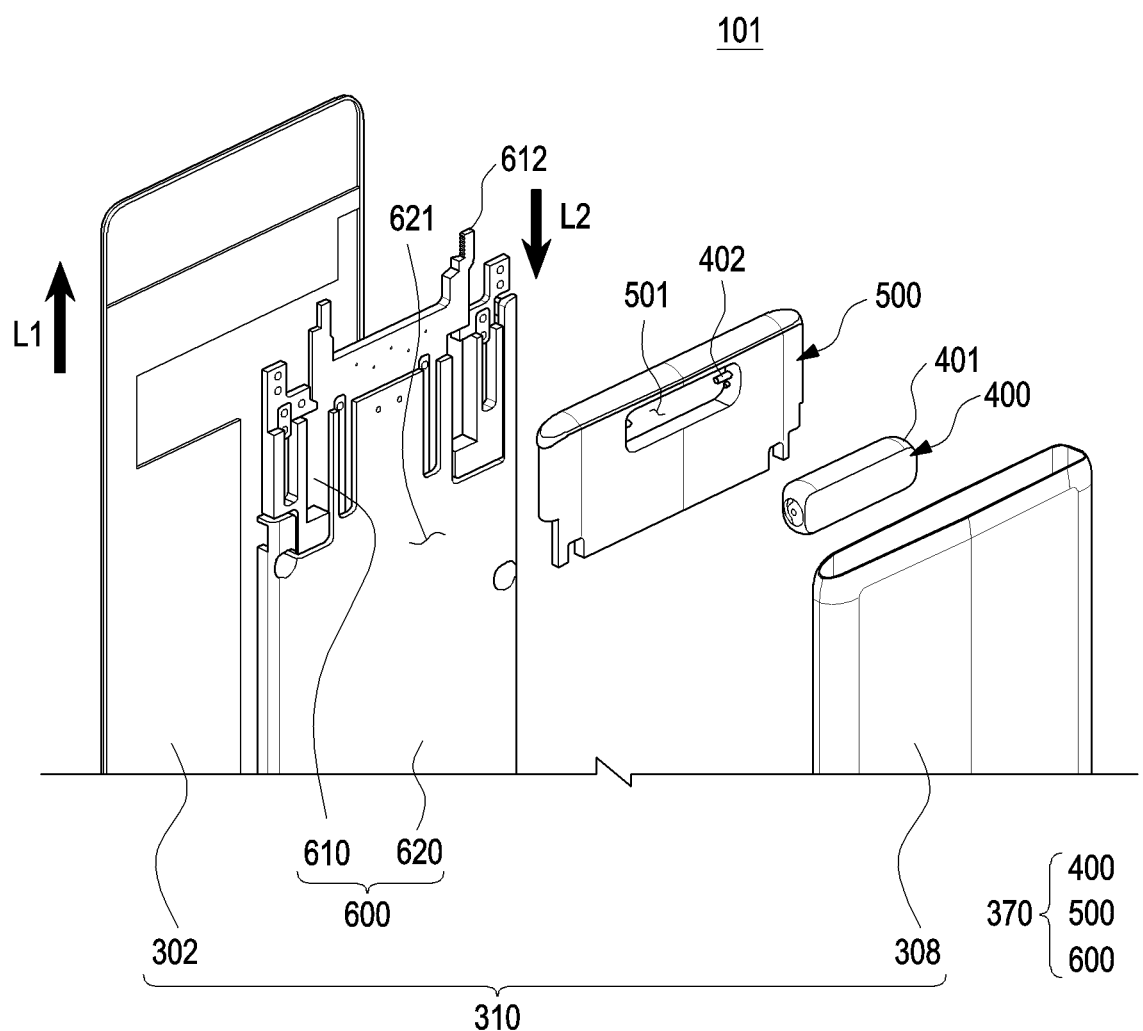
FIG. 5 is an exploded perspective view of an electronic device viewed from one direction, according to certain embodiments of the disclosure.
Figure 6:
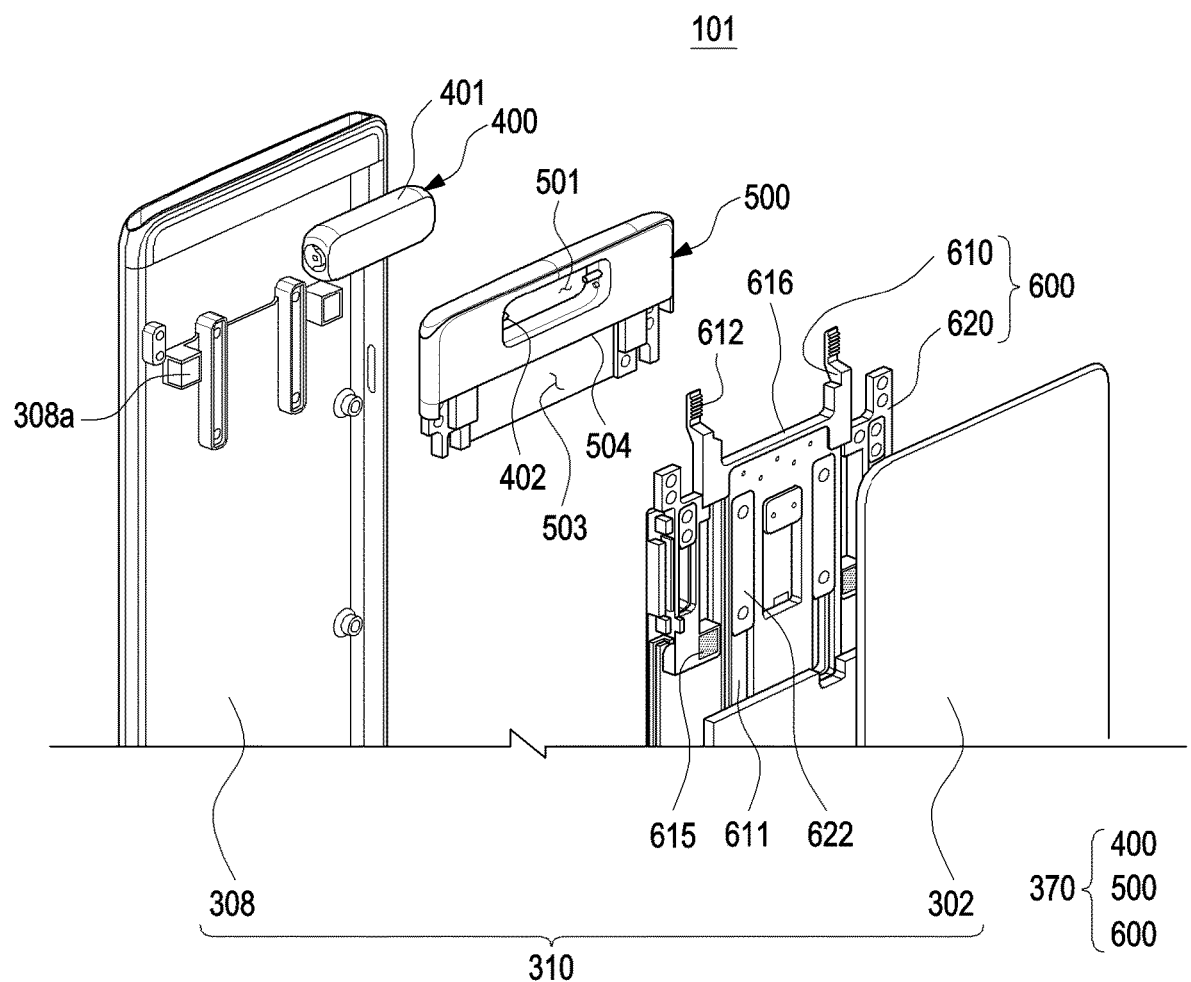
FIG. 6 is an exploded perspective view of an electronic device viewed from the other direction, according to certain embodiments of the disclosure.

FIG. 5 is an exploded perspective view of an electronic device viewed from one direction, according to certain embodiments of the disclosure. FIG. 6 is an exploded perspective view of an electronic device viewed from the other direction, according to certain embodiments of the disclosure.

The pop-up structure 370 includes a camera module 400, pop-up unit 500 to which the camera module 400 is mounted, and a driving unit 600. The driving unit 600 drives the pop-up unit 500 in directions L1 (protruding) and L2 (retracting).

The driving unit 600 includes a slide member 610 and a glide member 620. The slide member 610 may be coupled to be slidable with respect to the rear plate 308 and/or the guide member 620. The slide member 610 includes a sliding motor 613 with a gear 614. The gear 614 is engaged with teeth on the glide member 620. Thus, when the sliding motor 613 rotates, the gear 614 grips the teeth 623 of the glide member 620 causing the slide member 610 to move, either in direction L1 or L2.

According to certain embodiments, an electronic device 101 may include a front plate 302, a rear plate 308, and a camera pop-up structure 370 which can be disposed between the front plate 302 and the rear plate 308. The camera pop-up structure 370 may include: a camera module 400; a pop-up unit 500 which enables the camera module 400 to pop up; and a driving unit 600 which is connected to the pop-up unit 500 and slides the pop-up unit 500 in an upper end direction (e.g., a third direction L1) or a lower end direction (e.g., a fourth direction L2) of a housing 101 (e.g., the housing 101 of FIGS. 2A to 4).

The front plate 302, the rear plate 308, and the camera pop-up structure 370 of FIGS. 5 and 6 may be partially or entirely the same as the front plate 302, the rear plate 308, and the camera pop-up structure 370 of FIGS. 2A and 4.

The camera module 400 may include a case 401 for accommodating at least one electronic component, and rotating shafts 402 extending from the case 401 or toward the case 401. According to an embodiment, the electronic component may include the camera devices 410 and 420, the sensor module 430, or the light-emitting element 440 of FIGS. 3A and 3B, and may receive light as input or output light to the outside through one surface of the case 401. According to an embodiment, the rotating shafts 402 may extend from both ends of the case 401 or toward the both ends, respectively, and may be rotatably mounted inside the pop-up unit 500. In an embodiment, when the camera module 400 is mounted in the pop-up unit 500, the rotating shafts (402) may be aligned perpendicular to the third direction L1 or the fourth direction L2.

The pop-up unit 500 may be accommodated inside the housing 310 together with the camera module 400, or protrude (e.g., pop up) to the outside of the housing 310. The pop-up unit 500 may include: an opening 501 in which the camera module 400 is rotatably disposed; a gear hinge structure (e.g., a gear hinge structure 502 of FIG. 10) which is adjacent to the opening 501 and guides a rotary motion of the camera module 400; and a coupling region 503 mechanically connected to the driving unit 600.

The driving unit 600 may be mounted inside the housing 310, and slide with respect to the rear plate 308. For example, the driving unit 600 may slide in the third direction L1 or the fourth direction L2 inside the electronic device 101, and may slide the pop-up unit 500 connected to one side of the driving unit 600 from the inside to the outside (e.g., the third direction L1) of the housing 310 or from the outside to the inside thereof (e.g., the fourth direction L2).

According to an embodiment, the driving unit 600 may include: a slide member (610) which is slidable according to the operation of a driving motor (e.g., a driving motor 613 of FIG. 7); and a guide member 620 for guiding the movement of the slide member 610. The slide member 610 may be coupled to be slidable with respect to the rear plate 308 and/or the guide member 620.

In an embodiment, the slide member 610 may include guide holes 611 formed therein, and may be coupled with guide ribs 622 of the guide member 620 such that the guide holes 611 can slide in the third direction L1 or the fourth direction L2. In an embodiment, the slide member 610 may include rack gears 612 disposed on both side ends of an upper end region. At least a portion of the upper end region may be coupled to the coupling region 503 of the pop-up unit 500 while being seated therein. The rack gears 612 may be engaged with gear structures (e.g., a pinion gear 403 of FIG. 7) disposed inside the camera module 400. For example, in a second section (e.g., a second section S2 of FIG. 7) described later, when the slide member 610 slides, the rack gear 612 may linearly move and the pinion gear 403 of the camera module 400 may rotate by being engaged with the rack gear 612. Accordingly, the camera module 400 coupled to the pinion gear 403 may rotate. In another embodiment, in a second section (e.g., a second section S2 of FIG. 7) described later, the pop-up unit 500 connected to the slide member 610 may slide, and the camera module 400 may be disposed to be oriented toward the rear side of the electronic device 101 in a first position P1 and may be disposed to be oriented toward the front side of the electronic device 101 in a second position P2.

In an embodiment, the slide member 610 may include: a driving motor (e.g., a driving motor 613 of FIG. 7) disposed in a lower end region; and a gear (e.g., a gear 614 of FIG. 7) disposed in one side of the driving motor 613. The gear 614 is connected to teeth (e.g., teeth 623 of FIG. 8) disposed on the guide member 620 in parallel to the third direction L1 or the fourth direction L2, and may rotate by being engaged with the teeth 623 according to the rotation of the driving motor 613. For example, in response to the rotation of the driving motor 613, the gear 614 may rotate by being engaged with the teeth 623, and accordingly, the slide member 610 may linearly move in the third direction L1 or the fourth direction L2.

In an embodiment, the slide member 610 may include at least one first magnet 615 disposed to be adjacent to the guide hole 611. The first magnet 615 is used for magnetic coupling with a second magnet 308a disposed on the rear plate 308, and may stably guide the sliding movement of the slide member 610. For example, for the stable slide coupling of the slide member 610, a plurality of first magnets 615 may be arranged in both sides of the slide member 610.

According to an embodiment, the guide member 620 may include: a support region 621 in which the slide member 610 is slidably seated; and a guide rib 622 disposed inside the guide hole 611. In another embodiment, the guide member 620 may further include a lead screw (e.g., a teeth 623 of FIG. 8) for guiding a movement route of a gear 614 of the slide member 610. The support region 621 is fixed to one region of the rear plate 308 so as to guide the sliding movement of the slide member 610 with respect to the support region 621. The guide rib 622 may be disposed to be directly fixed to the rear plate 308, and may be disposed on the guide member 620 in parallel to the third direction L1 or the fourth direction L2 so as to limit a region in which the guide hole 611 of the slide member 610 can move. The teeth 623 may be disposed on the guide member 620 in parallel to the third direction L1 or the fourth direction L2 so as to limit a region in which the gear 614 can move, the gear being rotated by the driving motor 613.

Figure 7:
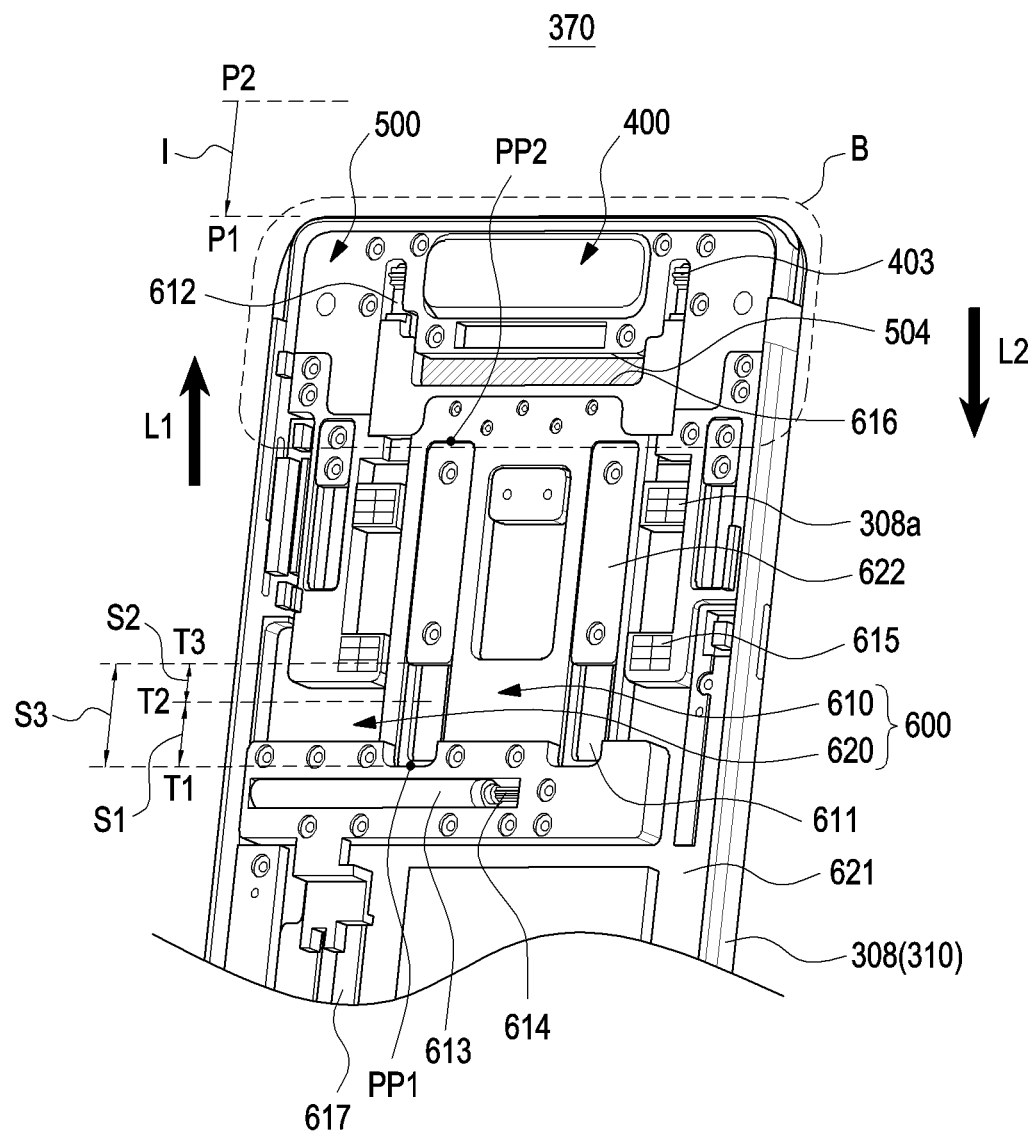
FIG. 7 illustrates an internal structure in a state where a pop-up unit of a camera pop-up structure, in which a camera module is mounted, is accommodated inside a housing or an electronic device, according to certain embodiments of the disclosure.
Figure 8:
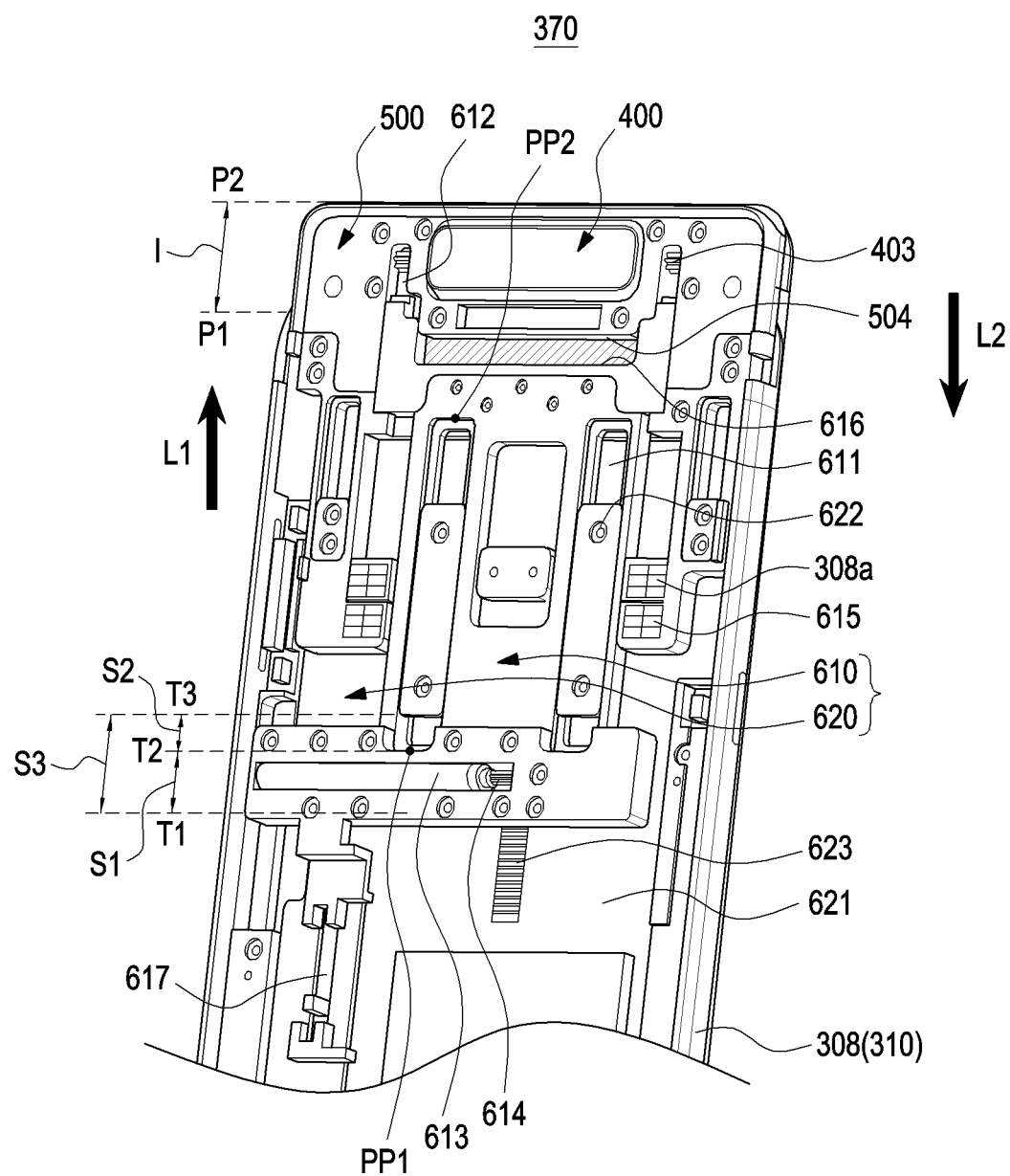
FIG. 8 illustrates an internal structure in a state where a pop-up unit, in which a camera module is mounted, protrudes (e.g., pops up) to the outside of a housing, according to certain embodiments of the disclosure.
Figure 9:
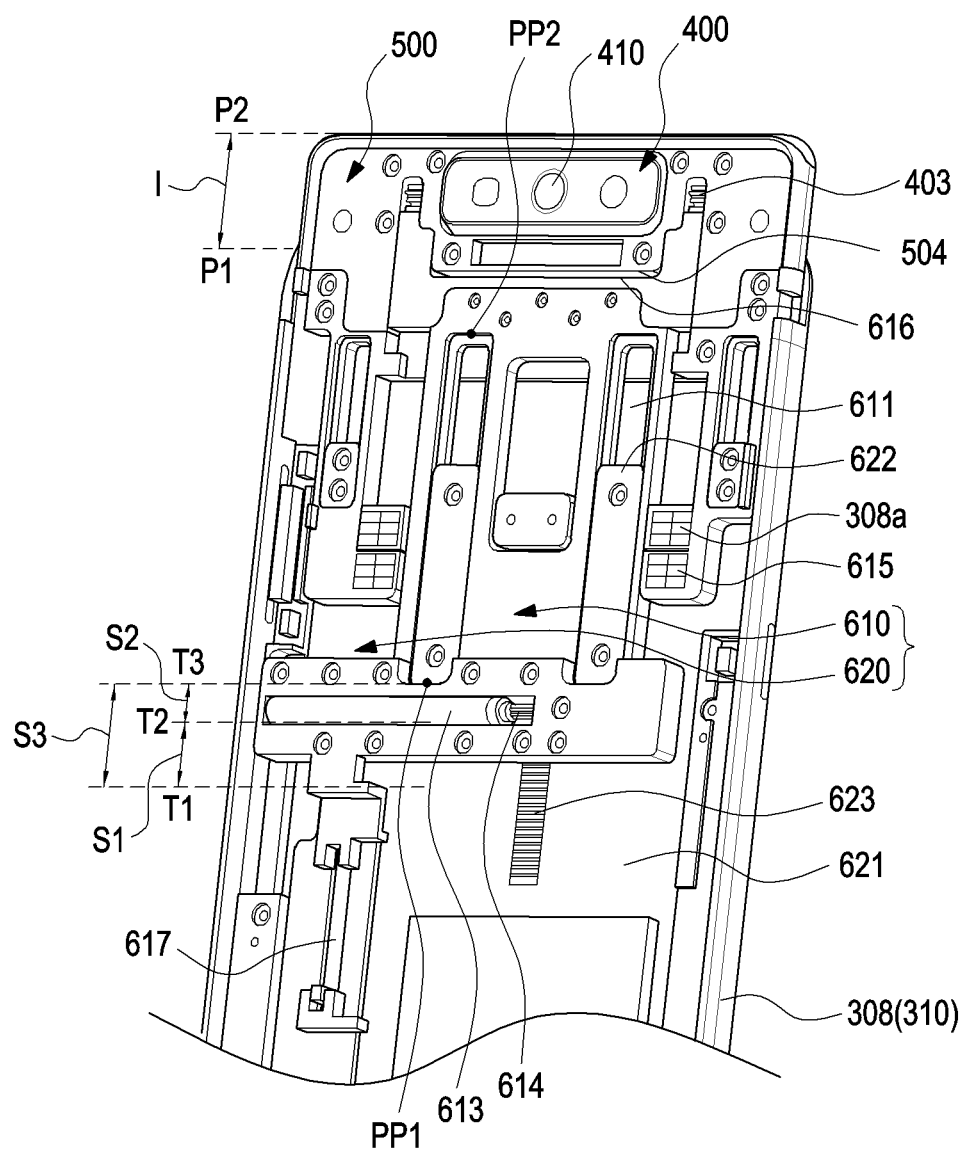
FIG. 9 illustrates an internal structure in a state where a camera module is rotated while a pop-up unit in which the camera module is mounted protrudes to the outside of a housing, according to certain embodiments of the disclosure.

Hereinafter, FIGS. 7 to 9 illustrate an operation in which a pop-up unit 500 of a camera pop-up structure 370 moves from a position P1 to a position P2. FIG. 7 shows the camera pop-up structure 370 inside the housing 310. FIG. 8 shows the camera pop-up structure 370 outside the housing 310 with the camera module 400 facing away. FIG. 9 shows the camera pop-up structure 370 outside the housing 310 with the camera module 400 facing towards.

When the camera module 400 is moved from within the housing 310 (in FIG. 7) to protrude from the housing 310 (in FIG. 8), the sliding motor 613 rotates causing gear 614 to move upwards along teeth 623. The guide hole 611 moves upwards relative to the guide ribs 622, causing the guide hole 611 to become smaller below the guide ribs 622, and increase in size above the guide ribs 622. PP2 moves away from the top of guide ribs 622. Additionally, when the camera module 400 protrudes from the housing 310, magnets 615 and 308a come into contact.

In FIG. 9, PP2 moves further away from the tope of guide ribs 622, while PP1 makes contact. However, the pop-up unit 500 remains at P2, while camera module 400 rotates approximately 180 degrees.

FIGS. 7 to 9 successively illustrate an operation in which, in an electronic device (e.g., the electronic device 101 of FIGS. 2A to 6) according to certain embodiments disclosed in this document, a camera module 400 and a pop-up unit 500 are exposed to the outside while being accommodated in a housing 310. FIG. 7 illustrates an internal structure in a state where a pop-up unit 500 of a camera pop-up structure 370, in which a camera module 400 is mounted, is accommodated inside a housing 310 or an electronic device 101, or retracted. FIG. 8 illustrates an internal structure in a state where a pop-up unit 500, in which a camera module 400 is mounted, protrudes (e.g., pops up) to the outside of a housing 310. FIG. 9 illustrates an internal structure in a state where a camera module 400 is rotated while a pop-up unit 500 protrudes to the outside of a housing 310.

Referring to FIGS. 7 to 9, an electronic device 101 may include a rear plate 308 and a camera pop-up structure 370, at least a part of the camera pop-up structure being movably mounted on the rear plate 308. The camera pop-up structure 370 may include a driving unit 600, a pop-up unit 500, and a camera module 400, and the driving unit 600 may include a slide member 610 and a guide member 620. The specific configuration of the rear plate 308 and the camera pop-up structure 370 which are shown in FIGS. 7 to 9 may be partially or entirely the same as the rear plate 308 and the camera pop-up structure 370 which are shown in FIGS. 2A to 6.

According to certain embodiments, a section in which the slide member 610 can slide with respect to the guide member 620 may be divided into a first section S1 and a second section S2, and the sum of the first section S1 and the second section S2 indicates the entire section in which the slide member 610 can move and can be defined as a third section S3. For example, the first section S1 and/or the second section S2 may be a section in which a guide hole 611 can move in a third direction L1 or a fourth direction L2 with reference to a guide rib 622 fixed onto the rear plate 308.

According to certain embodiments, the slide member 610 of the electronic device 101 may make a division among a first mode (referring to FIG. 7), a second mode (referring to FIG. 8), and a third mode (referring to FIG. 9) in accordance with whether the slide member slides with respect to the guide member 620 and a position change due to the sliding motion.

The first mode may indicate a state where the pop-up unit 500, in which the camera module 400 is mounted, is inserted into the housing 310 or the electronic device 101.

The second mode may indicate a state where the slide member 610 moves with respect to the guide member 620 by a predetermined section (e.g., the first section S1), and at least a part of the pop-up unit 500 linked with the slide member 610 and including the camera module 400 mounted therein is exposed to the outside of the housing 310. For example, the second mode may be a state where the slide member 610 is sliding within the first section S1.

The third mode may indicate a state where the slide member 610 has moved with respect to the guide member 620 by a predetermined section (e.g., the second section S2) within the housing 310 after the completion of the second mode. In another embodiment, the third mode may indicate an operation in which the pop-up unit 500, in which the camera module 400 is mounted, does not additionally linearly move and the camera module 400 rotates. In another embodiment, the third mode may indicate one state of an operation in which the camera module 400 rotates.

Referring to FIG. 7, the first mode according to certain embodiments may be provided. According to an embodiment, when the camera pop-up structure 370 is accommodated inside the housing 310 or the electronic device 101, the electronic device has no opening or the like for a camera device, which is formed on the front surface and/or the rear surface thereof, and includes a display mounted therein, a screen display region of the display having an area close to 100% of an area of the front surface of the housing 310, thereby providing a pleasing appearance.

According to an embodiment, the slide member 610 in the first mode may be in a state where the same has moved further in the fourth direction L2, relatively in comparison with the second mode or the third mode. According to an embodiment, in the first mode, an upper end region of the guide hole 611 of the slide member 610 may be disposed to be in contact with the guide rib 622 of the guide member 620. For example, the guide hole 611 of the slide member 610 may include a first point PP1 that is the lower end portion thereof and a second point PP2 that is the upper end portion thereof along the longitudinal direction thereof. The first point PP1 may be disposed to be spaced apart from the lower end of the guide rib 622, and the second point PP2 may be disposed to be in contact with the upper end of the guide rib 622. A distance between the first point PP1 and the lower end of the guide rib 622 may be the same as the third section S3.

According to an embodiment, in the first mode, a part of the slide member 610 and a part of the pop-up unit 500 may be mechanically connected to each other, and other parts thereof may be disposed to be spaced a predetermined distance apart from each other. For example, both side ends of an upper end region of the slide member 610 include rack gears (e.g., the rack gears 612 of FIG. 6), and the rack gears 612 may be arranged while being engaged with pinion gears 403 protruding to the outside of the camera module 400. In another embodiment, an upper portion 616 of the slide member 610 may be spaced apart from a lower portion 504 of the pop-up unit 500, and a distance therebetween may be the same as the second section S2.

According to an embodiment, a first magnet 615 of the slide member 610 and a second magnet 308a disposed on the rear plate 308 may be disposed to be spaced apart from each other.

According to an embodiment, a processor (e.g., the processor 120 of FIG. 1) electrically connected to a driving motor 613 may control whether the slide member 610 slides with respect to the guide member 620 and a distance of the movement section. According to another embodiment, a sensing portion 617 disposed in one region (e.g., the lower end portion) of the slide member 610, a sensor (e.g., a sensing sensor), and the processor 120 electrically connected to the same may control whether the slide member 610 slides with respect to the guide member 620 and a distance of the movement section.

Referring to FIG. 8, the second mode according to certain embodiments may be provided. According to an embodiment, in the second mode, the pop-up unit 500, in which the camera module 400 is mounted, may be in a state where the same is protruding or has protruded to the outside of the housing 310. For example, the upper end of the pop-up unit 500 may move from a position P1 to a position P2 by sliding in the third direction L1 and protruding by a section I from the upper end of the housing 310.

According to an embodiment, the camera module 400 may slide in the third direction L1 while being linked with the pop-up unit 500, and may be in a mode in which camera photographing is possible. For example, the first camera device may be disposed to be oriented rearwards. In another embodiment, the first camera device may be disposed to be oriented rearwards, and the second camera may be disposed to be oriented forwards.

According to an embodiment, the slide member 610 in the second mode may be in a state where the same has moved by the first section S1 in the third direction L1, relatively in comparison with the first mode. For example, the guide hole 611 of the slide member 610 may include a first point PP1 that is the lower end portion thereof and a second point PP2 that is the upper end portion thereof along the longitudinal direction thereof. The first point PP1 may be disposed to be spaced apart from the lower end of the guide rib 622, and the second point PP2 may be disposed to be spaced apart from the upper end of the guide rib 622. A distance between the first point PP1 and the lower end of the guide rib 622 may be the same as the second section S2, and a distance between the second point PP2 and the upper end of the guide rib 622 may be the same as the first section S1. According to another embodiment, in the second mode, the first point PP1 may move by the first section S1 (e.g., a distance from a first position T1 to a second position T2 of FIG. 7) in the third direction L1, and the second point PP2 may move by a distance corresponding to the first section S1 in the third direction L1.

According to an embodiment, the sliding movement of the slide member 610 in the third direction L1 is linked with the pop-up unit 500 so as to cause the pop-up unit 500 to protrude from the housing 310 in the first direction L1. The section I by which the pop-up unit 500 protrudes may be the same as the first section S1.

According to an embodiment, in the second mode, a part of the slide member 610 and a part of the pop-up unit 500 are mechanically connected to each other, and the other parts thereof may be spaced a predetermined distance apart from each other. For example, both side ends of an upper end region of the slide member 610 include rack gears (e.g., the rack gears 612 of FIG. 6), and the rack gears 612 may be disposed while (e.g., rotating or having rotated) being engaged with pinion gears 403 protruding to the outside of the camera module 400. In another embodiment, an upper portion 616 of the slide member 610 may be spaced apart from a lower portion 504 of the pop-up unit 500, and a distance therebetween may be the same as the second section S2.

According to an embodiment, a first magnet 615 of the slide member 610 may be disposed to be adjacent to a second magnet 308a disposed on the rear plate 308 by sliding in the first direction L1. The first magnet 615 and the second magnet 308a are magnetically coupled to each other so as to stably maintain the final state of the second mode.

According to an embodiment, a processor (e.g., the processor 120 of FIG. 1) electrically connected to a driving motor 613 may control whether the slide member 610 slides with respect to the guide member 620 and a distance of the movement section. When the second mode is being executed, the processor 120 may control the number of rotations of the driving motor 613 such that the slide member 610 moves by a distance corresponding to the first section S1 in the first direction L1. According to another embodiment, a sensing portion 617 disposed in one region (e.g., the lower end portion) of the slide member 610, a sensor (e.g., a sensing sensor), and the processor 120 electrically connected to the same may control whether the slide member 610 slides with respect to the guide member 620 and a distance of the movement section. When the second mode is being executed, the processor 120 may control the driving motor 613 such that the slide member 610 moves in the first direction L1, and may perform control such that the driving motor 613 does not rotate when receiving, through the sensor, a signal indicating that the sensing portion 617 has moved by a distance corresponding to the first section S1.

Referring to FIG. 9, the third mode according to certain embodiments may be provided. According to an embodiment, in the third mode, the pop-up unit 500, in which the camera module 400 is mounted, may be in a state where the same has protruded to the outside of the housing 310, and the camera module 400 may be in a state where the same is rotating or has rotated. For example, the upper end of the pop-up unit 500 is fixed to the same position as that in the second mode while protruding by the section I in the third direction L1, and only the camera module 400 may be reversely positioned according to the rotation thereof.

According to an embodiment, in the second mode, a first camera device 410 disposed to be oriented rearwards may be disposed to be oriented forwards by rotating in a clockwise or counterclockwise direction. According to another embodiment, in the second mode, a first camera device 410 disposed to be oriented rearwards and a second camera device disposed to be oriented forwards may be disposed to be oriented forwards and rearwards by rotating in a clockwise or counterclockwise direction. In FIGS. 11 to 14, a rotary motion of the camera module 400 will be described in detail.

According to an embodiment, the slide member 610 in the third mode may be in one state where the same moves by the second section S2 in the third direction L1, relatively in comparison with the second mode. According to an embodiment, in the third mode, a lower end region of the guide hole 611 of the slide member 610 may be disposed to be in contact with the guide rib 622 of the guide member 620. For example, the guide hole 611 of the slide member 610 may include a first point PP1 that is the lower end portion thereof and a second point PP2 that is the upper end portion thereof along the longitudinal direction thereof. The first point PP1 may be disposed to be in contact with the lower end of the guide rib 622, and the second point PP2 may be disposed to be spaced apart from the upper end of the guide rib 622. A distance between the second point PP2 and the upper end of the guide rib 622 may be the same as the third section S3. According to another embodiment, in the third mode, the first point PP1 may move by the second section S2 (e.g., a distance from a second position T2 to a third point T3 of FIG. 7) in the third direction L1, and the second point PP2 may move by a distance corresponding to the second section S2 in the third direction L1.

According to an embodiment, in the third mode, a part of the slide member 610 and a part of the pop-up unit 500 are mechanically connected to each other, and the other parts thereof may be disposed to be in contact with each other. For example, both side ends of an upper end region of the slide member 610 may include rack gears (e.g., the rack gears 612 of FIG. 6), and the rack gears 612 may move in the first direction L1 by rotating while being engaged with pinion gears 403 arranged within the camera module 400. According to another embodiment, in the second mode, an upper portion 616 of the slide member 610 is spaced a distance corresponding to the second section S2 apart from a lower portion 504 of the pop-up unit 500, but in the third mode, the upper portion 616 of the slide member 610 may be disposed to be in contact with the lower portion 504 of the pop-up unit 500 by moving by a distance corresponding to the second section S2 in the first direction L1.

According to an embodiment, a processor (e.g., the processor 120 of FIG. 1) electrically connected to a driving motor 613 may control whether the slide member 610 slides with respect to the guide member 620 and a distance of the movement section. When the third mode is being executed, the processor 120 may control the number of rotations of the driving motor 613 such that the slide member 610 moves by a distance corresponding to the second section S2 in the first direction L1. According to another embodiment, a sensing portion 617 disposed in one region (e.g., the lower end portion) of the slide member 610, a sensor module 430 (e.g., a sensing sensor), and the processor 120 electrically connected to the same may control whether the slide member 610 slides with respect to the guide member 620 and a distance of the movement section. When the third mode is being executed, the processor 120 may control the driving motor 613 such that the slide member 610 moves in the first direction L1, and may perform control such that the driving motor 613 does not rotate when sensing, through the sensor, that the sensing portion 617 has moved by a distance corresponding to the second section S2.

Figure 10:
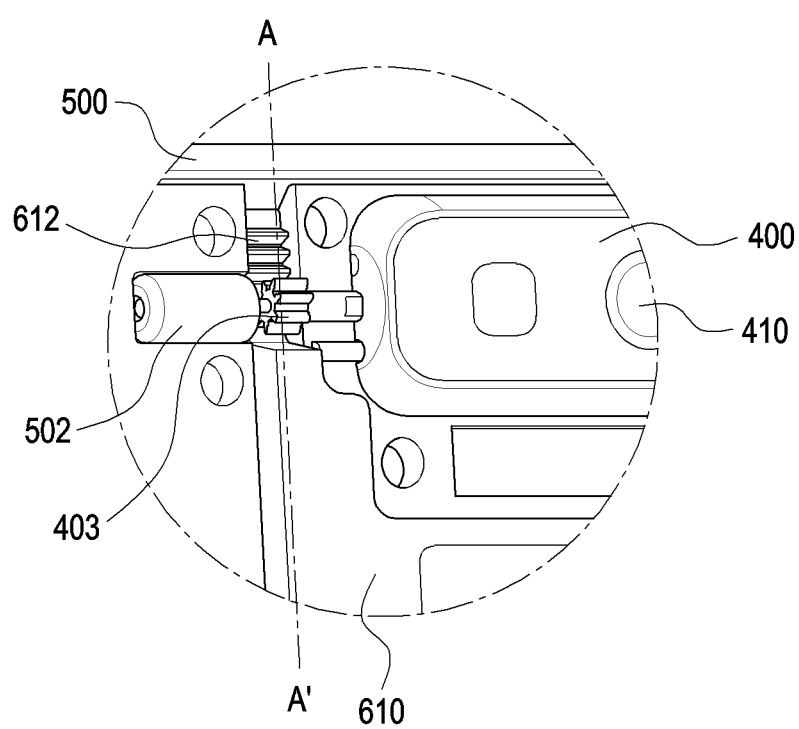
FIG. 10 is an enlarged perspective view of portions of a camera module and a pop-up unit of FIG. 9.

FIG. 10 is an enlarged perspective view of portions of a camera module and a pop-up unit of FIG. 9.

Figure 12:
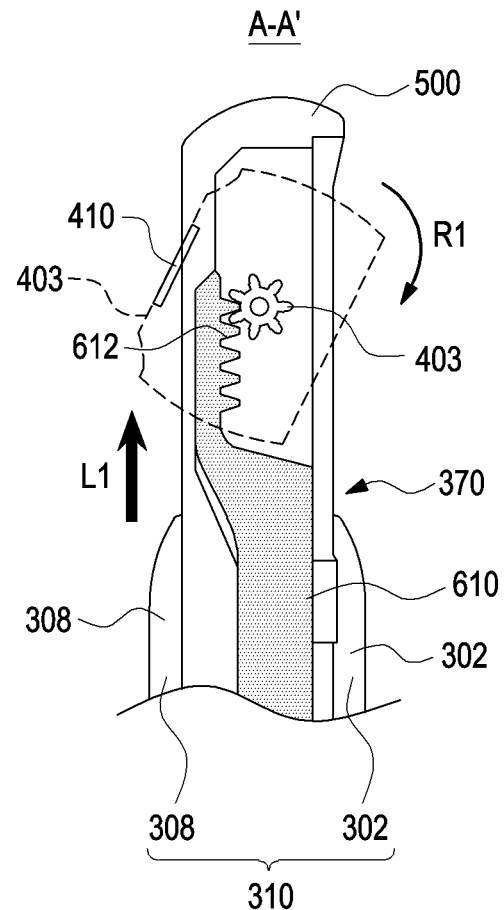
Figure 13:
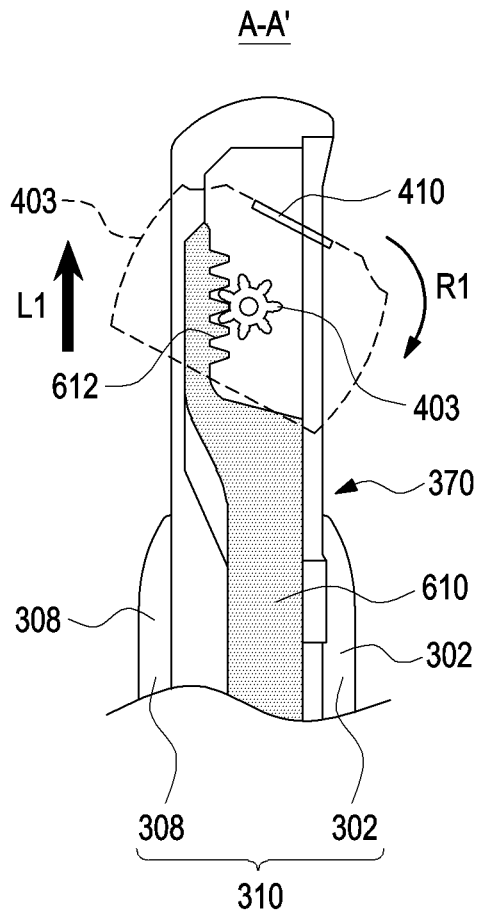
Figure 14:
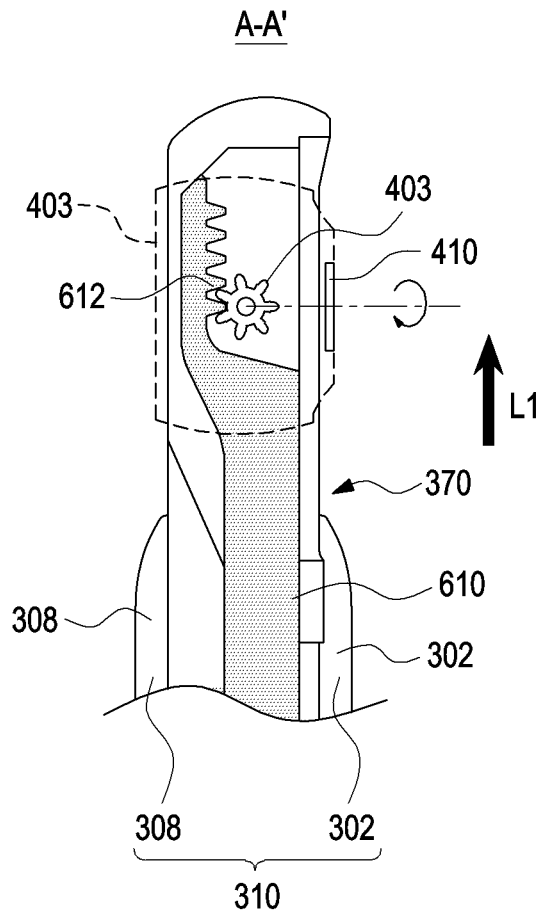

FIGS. 11 to 14 illustrate a rotation state of a camera module when a mode is switched from a second mode to a third mode. FIG. 14 is a cross-sectional view, taken along line A-A' of FIG. 10, and illustrates a state where the rotation of a camera is completed.

The camera module 400 is rotatable and includes a pinion gear 403. The driving unit 600 includes a rack gear 612 extending from the slide member 610. As the slide member 610 moves upwards, the rack gear 612 engages with pinion gear 403, causing the camera module 400 to rotate about an axis formed by the pinion gear 403. The pop-up unit 500 remains stationary as the slide member 610 and the rack gear 612 move upwards.

According to certain embodiments, an electronic device 101 may include a front plate 302, a rear plate 308, and a camera pop-up structure 370, at least a part of the camera pop-up structure being movably mounted on the rear plate 308. The camera pop-up structure 370 may include a driving unit 600, a pop-up unit 500, and a camera module 400, and the driving unit 600 may include a slide member 610. The specific configuration of the front plate 302, the rear plate 308, and the camera pop-up structure 370 of FIGS. 10 to 14 may be partially or entirely the same as the configuration of the rear plate 308 and the camera pop-up structure 370 of FIGS. 2A to 9.

Figure 11:
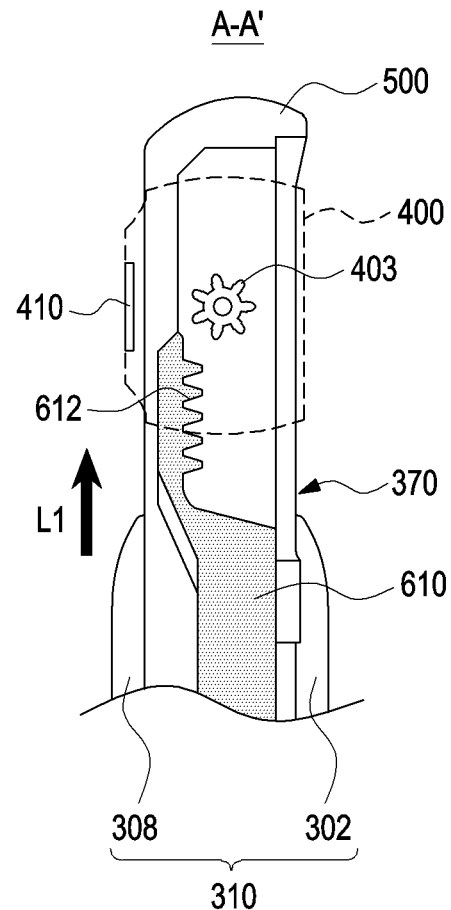
FIGS. 11 to 14 illustrate a rotation state of a camera module according to certain embodiments of the disclosure.

According to an embodiment, FIG. 11 illustrates a second mode, and FIGS. 10 and 12 to 14 illustrate a third mode.

Referring to FIG. 11, in a second mode, a first camera 410 may be disposed to be oriented toward a second direction (e.g., rearwards) while the camera module 400 protrudes from a housing 310.

FIGS. 12 to 14 successively illustrate an operation in which the slide module 610 moves by a second section (e.g., the second section S2 of FIG. 9), and the camera module 400 rotates. In a third mode (referring to FIG. 9), as a driving motor 613 operates, the slide member 610 slides with respect to a guide member 620 from a second position T2 to a third position T3 (e.g., in the third direction L1), and thus the camera module 400 rotates and the first camera 410 may be disposed to be oriented toward a first direction (e.g., forwards) of the electronic device 101. For example, while the slide member 610 moves by the second section S2, a linear motion of the camera module 400 or a pinion gear 403 is maintained to be limited, and thus only a rack gear 612 may linearly move. A linear motion of the rack gear 612 may rotate the pinion gear 403 and rotate the camera module 400 coupled to the pinion gear. The camera module 400 may rotate by 180 degrees in a first rotation direction R1.

According to an embodiment, an operation in which the camera module 400 rotates in a second rotation direction opposite the first rotation direction R1 (e.g., an operation in which the slide member 610 slides in the fourth direction L2) may be performed in reverse order of the operation successively disclosed in FIGS. 11 to 14.

Figure 15:
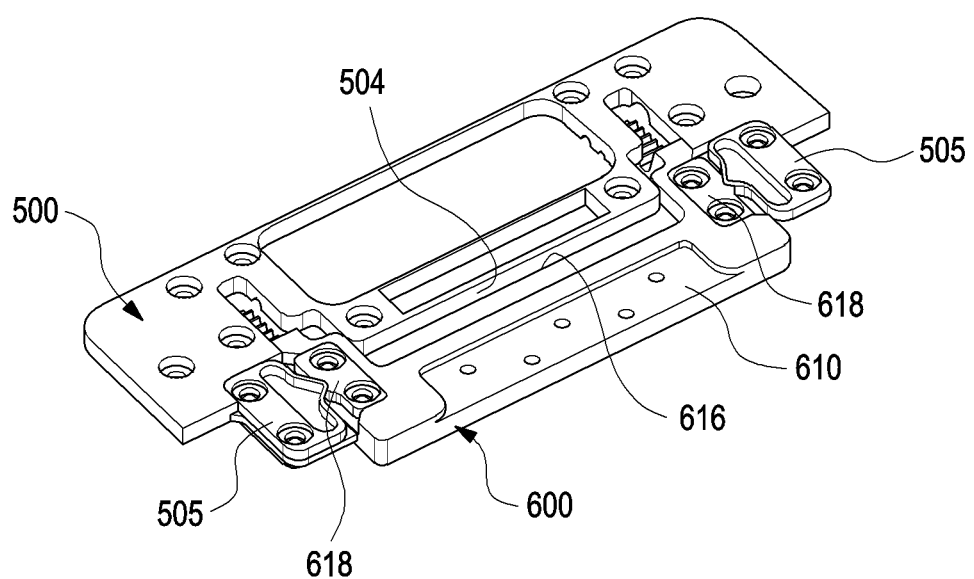
FIG. 15 is a perspective view illustrating a catching structure in an area B of FIG. 7, according to certain embodiments of the disclosure.

FIG. 15 is a perspective view illustrating a catching structure in an area B of FIG. 7, according to certain embodiments of the disclosure.

According to certain embodiments, an electronic device (the electronic device 101 of FIGS. 2A to 6) may include a camera pop-up structure (e.g., the camera pop-up structure 370 of FIGS. 7 to 9). The camera pop-up structure 370 may include a pop-up unit 500 and a driving unit 600, and the driving unit 600 may include a slide member 610.

The configuration of the pop-up unit 500 and the slide member 610 of the driving unit 600 of FIG. 15 may be partially or entirely the same as the configuration of the pop-up unit 500 and the slide member 610 of the driving unit 600 of FIGS. 2A to 9.

According to certain embodiments, a part of the slide member 610 and a part of the pop-up unit 500 may be mechanically connected to each other, and, depending on a mode (e.g., the first to third modes), an upper portion 616 of the slide member 610 may be disposed to be spaced apart from or in contact with a lower portion 504 of the pop-up unit 500.

According to certain embodiments, the slide member 610 and the pop-up unit 500 may be coupled to each other by means of a catching structure. For example, a first catching plate 618 may be disposed in a region adjacent to the upper portion 616 of the slide member 610, and a second catching plate 505 may be disposed in a region adjacent to the lower portion 504 of the pop-up unit 500. The sliding movement of the first catching plate 618 with respect to the second catching plate 505 provides mechanical coupling between the slide member 610 and the pop-up unit 500, thereby providing a user with the feeling of catching together with stable slide coupling.

According to an embodiment, at least a portion of the first catching plate 618 may be formed in a protruding shape, and the second catching plate 505 may include a portion having a recessed shape corresponding to the protruding shape. According to another embodiment, at least a portion of the first catching plate 618 may be formed in a recessed shape, and the second catching plate 505 may include a portion having a protruding shape corresponding to the recessed shape.

According to an embodiment, the first catching plate 618 may be disposed on each of both ends of the upper portion 616 of the slide member 610, and to correspond thereto, the second catching plate 505 may be disposed on each of both ends of the lower portion 504 of the pop-up unit 500.

An electronic device (e.g., the electronic device 101 of FIGS. 2A to 6) according to certain embodiments of the disclosure may include: a housing (e.g., 310 of FIG. 5) including a front plate (e.g., 302 of FIG. 5) oriented toward a first direction, and a rear plate (e.g., 308 of FIG. 5) oriented toward a second direction opposite the first direction; a display (e.g., 302 of FIG. 2A) for outputting a screen through the front plate; a guide member (e.g., 620 of FIG. 5) disposed inside the housing; a slide member (e.g., 610 of FIG. 5) which slides with respect to the guide member in a third direction or a fourth direction opposite the third direction, wherein a section for the sliding movement of the slide member includes a first section (e.g., S1 of FIG. 7) and a second section (e.g., S2 of FIG. 7) extending from the first section; a pop-up unit (e.g., 500 of FIG. 5) linked with the slide member moving within the first section, and sliding with respect to the housing in the third direction or the fourth direction between a position P1 accommodated inside the housing and a position P2 protruding from the housing; and a camera module (e.g., 400 of FIG. 5) which is linked with the slide member sliding within the second section and is rotatable to be oriented toward the first direction or the second direction.

According to certain embodiments, when the slide member moves within the first section, the upper end portion of the pop-up unit may slide from the position P1 to the position P2, and, when the slide member moves within the second section, the upper end portion of the pop-up unit may be disposed in the position P2.

According to certain embodiments, the sliding movement of the slide member within the first section and the second section may be provided in an inner space of the electronic device.

According to certain embodiments, when the slide member moves within the first section, one surface of the camera module may be disposed to be oriented toward the second direction, and, when the slide member moves within the second section, the one surface of the camera module may be disposed to be oriented toward the first direction parallel to the display.

According to certain embodiments, the slide member (e.g., 610 of FIG. 7) may include: at least one guide hole (e.g., 611 of FIG. 7) formed along the third direction or the fourth direction; rack gears (e.g., 612 of FIG. 7) which are disposed to be adjacent to the at least one guide hole and are disposed on both side ends of an upper end region of the slide member; a driving motor (e.g., 613 of FIG. 7) for sliding the slide member; and a gear (e.g., 614 of FIG. 7) rotatably disposed on a rotating shaft of the driving motor.

According to certain embodiments, the guide member (e.g., 620 of FIG. 7) may include: a support region (e.g., 621 of FIG. 5) in which the slide member is seated to be slidable; at least one guide rib (e.g., 622 of FIG. 7) disposed inside the at least one guide hole; and a lead screw (e.g., 623 of FIG. 8) for guiding a movement route of the gear of the slide member.

According to certain embodiments, the camera module (e.g., 400 of FIG. 5) may include: a case (e.g., 401 of FIG. 5) for accommodating at least one electronic component, at least a part of the case being exposed to the outside of the housing; a rotating shaft (e.g., 402 of FIG. 5) disposed on each of both ends of the case and rotatably mounted within the pop-up unit; and a pinion gear (e.g., 403 of FIG. 7) rotatably disposed on the rotating shaft.

According to certain embodiments, the pop-up unit (e.g., 500 of FIG. 6) may include: an opening (e.g., 501 of FIG. 6) in which the camera module is rotatably disposed; a gear hinge structure (e.g., 502 of FIG. 10) which is disposed to be adjacent to the opening and guides a rotary motion of the camera module; and a coupling region (e.g., 503 of FIG. 6) mechanically connected to the guide member or the slide member.

According to certain embodiments, at least one of the rack gears of the slide member may linearly move in the third direction or the fourth direction within the second section, and may rotate the camera module while being engaged with the pinion gear of the camera module.

According to certain embodiments, the slide member further includes a first magnet (e.g., 615 of FIG. 7) disposed to be adjacent to the at least one guide hole, and the first magnet may provide magnetic coupling with a second magnet (e.g., 308a of FIG. 7) disposed on the rear plate.

According to certain embodiments, the electronic device may further include a processor (e.g., 120 of FIG. 1) disposed within the housing and operatively connected to the slide member. When a camera photographing mode is executed in the electronic device, the processor may control the driving motor such that the slide member slides within the first section or the second section.

According to certain embodiments, the at least one guide hole of the slide member may include a first point (e.g., PP1 of FIG. 8) that is the lower end portion thereof and a second point (e.g., PP2 of FIG. 8) that is the upper end portion thereof along the longitudinal direction thereof. In the electronic device, when the slide member moves with respect to the guide member by the first section (e.g., S1 of FIG. 8), the first point may be disposed to be spaced apart from the lower end of the guide rib fixedly disposed on the guide member by moving from a first position (e.g., T1 of FIG. 8) to a second position (e.g., T2 of FIG. 8), and the second point may be disposed to be spaced apart from the upper end of the guide rib.

According to certain embodiments, when the slide member moves by the first section, the pop-up unit, in which the camera module is mounted, may slide from the position P1 to the position P2 and protrude from the housing or the electronic device.

According to certain embodiments, the at least one guide hole of the slide member may include a first point (e.g., PP1 of FIG. 9) that is the lower end portion thereof and a second point (e.g., PP2 of FIG. 9) that is the upper end portion thereof along the longitudinal direction thereof. When the slide member moves with respect to the guide member by the second section (e.g., S2 of FIG. 9), the first point may be disposed to be in contact with the lower end of the guide rib fixedly disposed on the guide member by moving from a second position (e.g., T2 of FIG. 9) to a third position (e.g., T3 of FIG. 9), and the second point may be disposed to be spaced apart from the upper end of the guide rib.

According to certain embodiments, when the slide member moves by the first section (e.g., S1 of FIG. 8), an upper portion (e.g., 616 of FIG. 8) of the slide member and a lower portion (e.g., 504 of FIG. 8) of the pop-up unit may be maintained to be spaced a distance corresponding to the second section apart from each other, and, when the slide member moves by the second section (e.g., S2 of FIG. 9), the slide member may move with respect to the pop-up unit by a distance corresponding to the second section in the third direction, and the upper portion (e.g., 616 of FIG. 9) of the slide member may be disposed to be in contact with the lower portion (e.g., 504 of FIG. 9) of the pop-up unit.

According to certain embodiments, the electronic device may further include a processor disposed within the housing and operatively connected to the slide member. In connection with the processor, when the electronic device is in a non-camera photographing mode, the pop-up unit, in which the camera module is mounted, may be accommodated within the housing.

According to certain embodiments, a first catching plate (e.g., 618 of FIG. 15) may be disposed in a region adjacent to the upper portion of the slide member, and a second catching plate (e.g., 505 of FIG. 15) may be disposed in a region adjacent to the lower portion of the pop-up unit. The sliding movement of the first catching plate with respect to the second catching plate may provide mechanical coupling between the slide member and the pop-up unit.

An electronic device (e.g., the electronic device 101 of FIGS. 2A to 6) according to certain embodiments of the disclosure may include: a housing (e.g., 510 of FIG. 5); and a camera pop-up structure (e.g., 370 of FIG. 5) which is coupled to the housing, at least a part of which slides with respect to the housing between a position P1 accommodated inside the housing and a position P2 protruding from the housing. The camera pop-up structure may include: a guide member (e.g., 620 of FIG. 5) fixedly coupled to the inside of the housing; a slide member (e.g., 620 of FIG. 5) which slides with respect to the guide member in one direction or a reverse direction within a first section (e.g., S1 of FIG. 7) and a second section (e.g., S2 of FIG. 7) extending from the first section; and a camera module (e.g., 400 of FIG. 5) which is linked with the slide member moving within the first section so as to slide between the position P1 accommodated inside the housing and the position P2 protruding from the housing, and is linked with the slide member sliding within the second section so as to rotate to be oriented toward the front side or the rear side of the housing.

According to certain embodiments, the electronic device may further include a processor disposed within the housing and operatively connected to the slide member. When a camera photographing mode is executed in the electronic device, the processor may control a driving motor such that the slide member slides within the first section or the second section.

According to certain embodiments, the slide member may include a sensing portion (e.g., 617 of FIG. 7) disposed in one region thereof and at least one sensor disposed to be adjacent to the sensing portion, and the processor may sense, by using the at least one sensor, whether the sensing portion moves or the movement section, and control the sliding movement of the slide member within the first section or the second section.

A camera pop-up structure according to certain embodiments of the disclosure may include: a guide member disposed inside a housing of an electronic device; a slide member which slides with respect to the guide member in a first direction or a second direction opposite the first direction, wherein a section for the sliding movement of the slide member includes a first section and a second section extending from the first section; a pop-up unit which is linked with the slide member moving within the first section and can slide with respect to the housing in the first direction or the second direction between a position P1 accommodated inside the housing and a position P2 protruding from the housing; and a camera module which is linked with the slide member sliding within the second section and can rotate so as to be oriented toward a third direction or a fourth direction opposite the third direction.

An electronic device according to certain embodiments comprises: a housing comprising a front plate facing a first direction and a rear plate facing a second direction opposite the first direction; a display configured to output content visible through the front plate; a guide member disposed inside the housing; a slide member configured to slide with respect to the guide member in a third direction or a fourth direction opposite the third direction, a section for the sliding movement of the slide member including a first section and a second section extending from the first section; a pop-up unit linked with the slide member moving within the first section, and configured to slide with respect to the housing in the third direction or the fourth direction between a first position accommodated inside the housing and a second position protruding from the housing; and a camera module linked with the slide member sliding within the second section, and configured to be rotatable to face the first direction or the second direction.

According to certain embodiments, when the slide member moves within the first section, an upper end portion of the pop-up unit slides from the first position to the second position, and when the slide member moves within the second section, the upper end portion of the pop-up unit is disposed in the second position.

According to certain embodiments, a sliding movement of the slide member within the first section and the second section are within an inner space of the electronic device.

According to certain embodiments, when the slide member moves within the first section, one surface of the camera module faces the second direction, and when the slide member moves within the second section, the one surface of the camera module is configured to rotate between facing the first direction to facing the second direction and vice versa.

According to certain embodiments, the slide member comprises: at least one guide hole formed along the third direction or the fourth direction; rack gears adjacent to the at least one guide hole, and disposed on both side ends of an upper end region of the slide member; a driving motor configured to slide the slide member; and a gear disposed on a rotating shaft of the driving motor.

According to certain embodiments, the guide member comprises: a support region in which the slide member is seated to be slidable; at least one guide rib disposed inside the at least one guide hole; and teeth configured to guide a movement route of the gear of the slide member.

According to certain embodiments, the camera module comprises: a case accommodating at least one electronic component, at least a part of the case being exposed to the outside of the housing; a rotating shaft disposed on each of both ends of the case, and rotatably mounted inside the pop-up unit; and a pinion gear rotatably disposed on the rotating shaft, and wherein at least one of the rack gears of the slide member linearly moves in the third direction or the fourth direction within the second section, and rotates the camera module while being engaged with the pinion gear of the camera module.

According to certain embodiments, the pop-up unit comprises: an opening in which the camera module is rotatably disposed; a gear hinge structure disposed to be adjacent to the opening and configured to guide a rotary motion of the camera module; and a coupling region mechanically connected to the guide member or the slide member.

According to certain embodiments, the slide member further comprises a first magnet disposed to be adjacent to the at least one guide hole, and the first magnet provides magnetic coupling with a second magnet disposed on the rear plate.

According to certain embodiments, the electronic device further comprises a processor disposed inside the housing and operatively connected to the slide member, wherein, when a camera photographing mode is executed in the electronic device, the processor controls the driving motor such that the slide member slides within the first section or the second section.

According to certain embodiments, the at least one guide hole of the slide member includes a first point corresponding to a lower end portion thereof and a second point corresponding to an upper end portion thereof along a longitudinal direction thereof, when the slide member moves with respect to the guide member by the first section, the first point is disposed to be spaced apart from a lower end of a guide rib fixedly disposed on the guide member by moving from a first position to a second position, and the second point is disposed to be spaced apart from an upper end of the guide rib, and when the slide member moves by the first section, the pop-up unit, in which the camera module is mounted, slides from the first position to the second position, and protrudes from the housing or the electronic device.

According to certain embodiments, the at least one guide hole of the slide member includes a first point corresponding to a lower end portion thereof and a second point corresponding to an upper end portion thereof along a longitudinal direction thereof, and when the slide member moves with respect to the guide member by the second section, the first point is disposed to be in contact with a lower end of a guide rib fixedly disposed on the guide member by moving from a second position to a third position, and the second point is spaced apart from an upper end of the guide rib.

According to certain embodiments, when the slide member moves by the first section, an upper portion of the slide member and a lower portion of the pop-up unit are maintained to be spaced a distance corresponding to the second section apart from each other, and when the slide member moves by the second section, the slide member moves with respect to the pop-up unit by a distance corresponding to the second section in the third direction, and the upper portion of the slide member is disposed to be in contact with the lower portion of the pop-up unit.

According to certain embodiments, the electronic device comprise a processor disposed inside the housing and operatively connected to the slide member, wherein, in connection with the processor, when the electronic device is in a non-camera photographing mode, the pop-up unit, in which the camera module is mounted, is accommodated inside the housing.

According to certain embodiments, an electronic device comprising: a housing; and a camera pop-up structure which is coupled to the housing, at least a part of which slides with respect to the housing between a first position accommodated inside the housing and a second position protruding from the housing, wherein the camera pop-up structure comprises: a guide member fixedly coupled to the inside of the housing; a slide member configured to slide with respect to the guide member by a first section and a second section extending from the first section in one direction or a reverse direction; and a camera module linked with the slide member moving within the first section so as to slide between the first position accommodated inside the housing and the second position protruding from the housing, and linked with the slide member sliding within the second section causing rotation towards a rear side or a front side of the housing.

A camera pop-up structure and an electronic device including the same according to certain embodiments of the disclosure, which are described above, are not limited to the embodiments described above and following drawings, and it would be obvious to those skilled in the art to which the disclosure belongs that various alternatives, modifications, and changes within a technical range of the disclosure are possible.

What is claimed is:

1. An electronic device comprising:
   a housing comprising a front plate facing a first direction and a rear plate facing a second direction opposite the first direction;
   a display configured to output a content visible through the front plate;
   a guide member disposed inside the housing;
   a slide member configured to slide with respect to the guide member in a third direction or a fourth direction opposite the third direction, a section for sliding movement of the slide member including a first section and a second section extending from the first section, the slide member comprises rack gears configured to extend in third direction from both side ends of an upper end region of the slide member;
   a pop-up unit linked with the slide member moving within the first section, and configured to slide with respect to the housing in the third direction or the fourth direction between a first position accommodated inside the housing and a second position protruding from the housing; and a camera module disposed on the pop-up unit and linked with the slide member sliding within the second section, and configured to be rotatable to face the first direction or the second direction, the camera module comprises pinion gears, wherein when the slide member slides in the second section, the pop-up unit is in a stopped state, and the rack gears moves along with the slide member in the third direction or the fourth direction to rotate the camera module while being engaged with the pinion gears of the camera module.

2. The electronic device of claim 1, wherein, when the slide member moves within the first section, an upper end portion of the pop-up unit slides from the first position to the second position, and when the slide member moves within the second section, the upper end portion of the pop-up unit is disposed in the second position.

3. The electronic device of claim 2, wherein a sliding movement of the slide member within the first section and the second section are within an inner space of the electronic device.

4. The electronic device of claim 2, wherein, when the slide member moves within the first section, one surface of the camera module faces the second direction, and when the slide member moves within the second section, the one surface of the camera module is configured to rotate between facing the first direction to facing the second direction and vice versa.

5. The electronic device of claim 1, wherein the slide member comprises:

at least one guide hole formed along the third direction or the fourth direction;

a driving motor configured to slide the slide member; and a gear disposed on a rotating shaft of the driving motor.

6. The electronic device of claim 5, wherein the guide member comprises:

a support region in which the slide member is seated to be slidable;

at least one guide rib disposed inside the at least one guide hole; and teeth configured to guide a movement route of the gear of the slide member.

7. The electronic device of claim 5, wherein the camera module comprises:

a case accommodating at least one electronic component, at least a part of the case being exposed to an outside of the housing; and a rotating shaft disposed on each of both ends of the case, and rotatably mounted inside the pop-up unit, on which the pinion gear rotatably disposed.

8. The electronic device of claim 6, wherein the pop-up unit comprises:

an opening in which the camera module is rotatably disposed;

a gear hinge structure disposed to be adjacent to the opening and configured to guide a rotary motion of the camera module; and a coupling region mechanically connected to the guide member or the slide member.

9. The electronic device of claim 5, wherein the slide member further comprises a first magnet disposed to be adjacent to the at least one guide hole, and the first magnet provides magnetic coupling with a second magnet disposed on the rear plate.

10. The electronic device of claim 5, further comprising a processor disposed inside the housing and operatively connected to the slide member, wherein, when a camera photographing mode is executed in the electronic device, the processor controls the driving motor such that the slide member slides within the first section or the second section.

11. The electronic device of claim 10, wherein the at least one guide hole of the slide member includes a first point corresponding to a lower end portion thereof and a second point corresponding to an upper end portion thereof along a longitudinal direction thereof, when the slide member moves with respect to the guide member by the first section, the first point is disposed to be spaced apart from a lower end of a guide rib fixedly disposed on the guide member by moving from a first position to a second position, and the second point is disposed to be spaced apart from an upper end of the guide rib, and when the slide member moves by the first section, the pop-up unit, in which the camera module is mounted, slides from the first position to the second position, and protrudes from the housing or the electronic device.

12. The electronic device of claim 10, wherein the at least one guide hole of the slide member includes a first point corresponding to a lower end portion thereof and a second point corresponding to an upper end portion thereof along a longitudinal direction thereof, and when the slide member moves with respect to the guide member by the second section, the first point is disposed to be in contact with a lower end of a guide rib fixedly disposed on the guide member by moving from a second position to a third position, and the second point is spaced apart from an upper end of the guide rib.

13. The electronic device of claim 10, wherein, when the slide member moves by the first section, an upper portion of the slide member and a lower portion of the pop-up unit are maintained to be spaced a distance corresponding to the second section apart from each other, and when the slide member moves by the second section, the slide member moves with respect to the pop-up unit by a distance corresponding to the second section in the third direction, and the upper portion of the slide member is disposed to be in contact with the lower portion of the pop-up unit.

14. The electronic device of claim 10, further comprising a processor disposed inside the housing and operatively connected to the slide member, wherein, in connection with the processor, when the electronic device is in a non-camera photographing mode, the pop-up unit, in which the camera module is mounted, is accommodated inside the housing.

* * * * *